US012688634B2

(12) United States Patent
Carmi et al.

(10) Patent No.: US 12,688,634 B2
(45) Date of Patent: Jul. 21, 2026

(54) METHODS AND SYSTEMS FOR SELECTIVE RECOMBINATION OF RECONSTRUCTED IMAGE REGIONS

(71) Applicant: GE Precision Healthcare LLC, Waukesha, WI (US)

(72) Inventors: Raz Carmi, Haifa (IL); Danielle Zeltser, Haifa (IL); Yariv Grobshtein, Haifa (IL)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 281 days.

(21) Appl. No.: 18/511,867

(22) Filed: Nov. 16, 2023

(65) Prior Publication Data

US 2025/0166246 A1      May 22, 2025

(51) Int. Cl.
*G06T 12/10* (2026.01)

(52) U.S. Cl.
CPC ........ *G06T 12/10* (2026.01); *G06T 2211/424* (2013.01); *G06T 2211/464* (2023.08)

(58) Field of Classification Search
None
See application file for complete search history.

(56) References Cited

U.S. PATENT DOCUMENTS

| | | | |
|---|---|---|---|
| 10,909,679 B2 * | 2/2021 | Westerhoff | A61B 6/463 |
| 11,354,832 B2 | 6/2022 | Bai et al. | |
| 11,657,508 B2 | 5/2023 | Richter et al. | |

| | | | |
|---|---|---|---|
| 2019/0339403 A1 * | 11/2019 | Bai | G01T 1/2985 |
| 2022/0221540 A1 * | 7/2022 | Fair | A61B 5/055 |
| 2022/0343496 A1 | 10/2022 | Zhang et al. | |
| 2022/0351431 A1 * | 11/2022 | Liu | G06T 5/70 |

FOREIGN PATENT DOCUMENTS

| | | | | |
|---|---|---|---|---|
| CN | 113192155 A | * | 7/2021 | G06T 12/30 |
| WO | 2023051632 A1 | | 4/2023 | |

OTHER PUBLICATIONS

Terpstra, M.—"Real-time 3D motion estimation from undersampled MRI using multi-resolution neural networks"—Medical Physics—Jun. 6, 2021—pp. 6597-6613 (Year: 2021).*

* cited by examiner

*Primary Examiner* — Bernard Krasnic
(74) *Attorney, Agent, or Firm* — McCoy Russell LLP

(57) ABSTRACT

Various methods and systems are provided for selective recombination of reconstructed nuclear medicine (NM) image regions. The method may include acquiring and sorting imaging scan data that includes data elements having different accuracy properties into two or more different groups using an anticipated accuracy metric, reconstructing a first initial image volume from a first group having a highest anticipated accuracy metric of the two or more different groups, reconstructing a second initial image volume from a combined data group comprising data of the first group and a second group of the two or more different groups, wherein the second group has a lower anticipated accuracy metric compared to the first group, and generating an optimized image volume using corresponding image values from the first initial image volume, the second initial image volume, and an output of a high spatial frequencies detection (HSFD) operator applied to the first initial image volume.

5 Claims, 17 Drawing Sheets

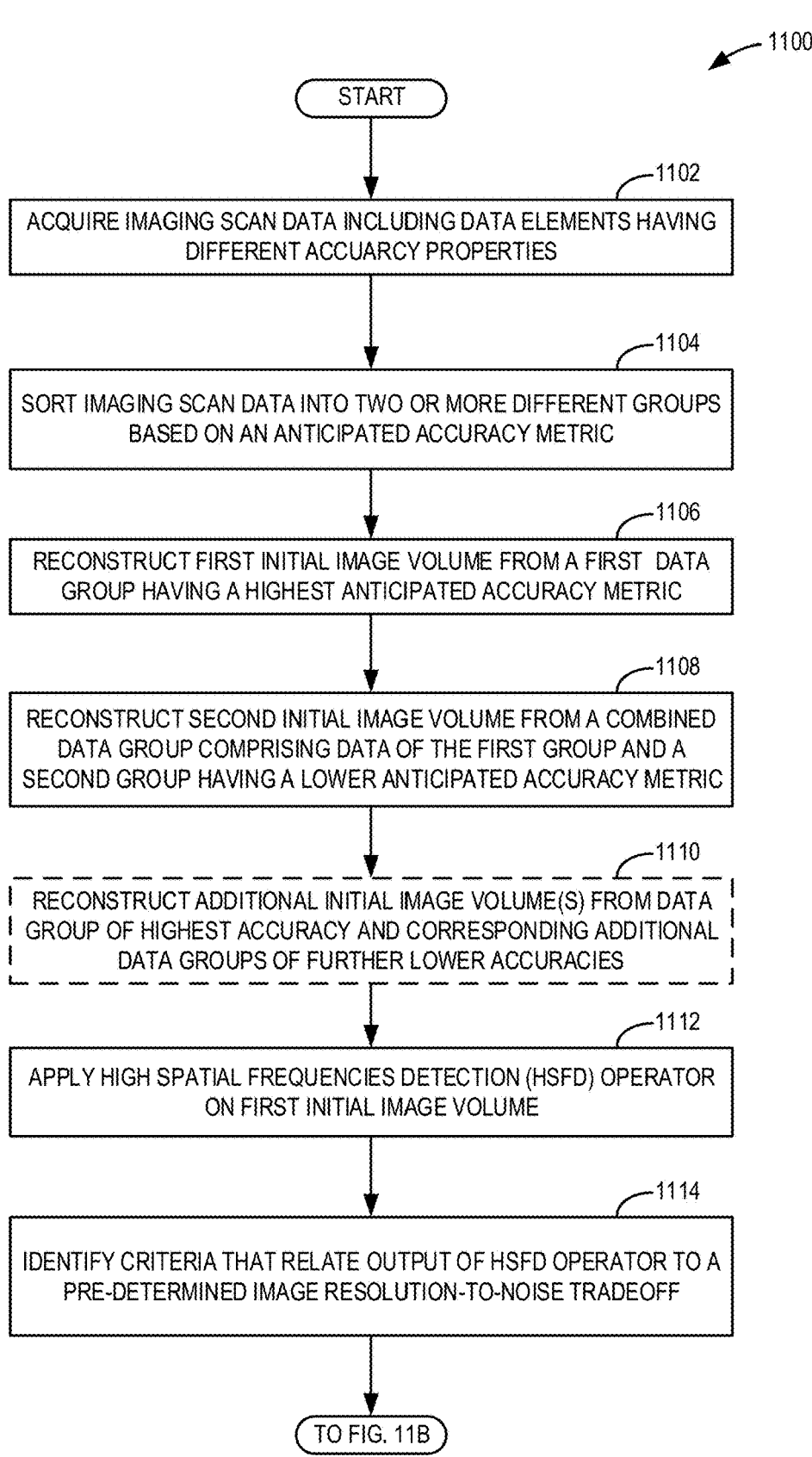

1100

START

1102

ACQUIRE IMAGING SCAN DATA INCLUDING DATA ELEMENTS HAVING DIFFERENT ACCUARCY PROPERTIES

1104

SORT IMAGING SCAN DATA INTO TWO OR MORE DIFFERENT GROUPS BASED ON AN ANTICIPATED ACCURACY METRIC

1106

RECONSTRUCT FIRST INITIAL IMAGE VOLUME FROM A FIRST DATA GROUP HAVING A HIGHEST ANTICIPATED ACCURACY METRIC

1108

RECONSTRUCT SECOND INITIAL IMAGE VOLUME FROM A COMBINED DATA GROUP COMPRISING DATA OF THE FIRST GROUP AND A SECOND GROUP HAVING A LOWER ANTICIPATED ACCURACY METRIC

1110

RECONSTRUCT ADDITIONAL INITIAL IMAGE VOLUME(S) FROM DATA GROUP OF HIGHEST ACCURACY AND CORRESPONDING ADDITIONAL DATA GROUPS OF FURTHER LOWER ACCURACIES

1112

APPLY HIGH SPATIAL FREQUENCIES DETECTION (HSFD) OPERATOR ON FIRST INITIAL IMAGE VOLUME

1114

IDENTIFY CRITERIA THAT RELATE OUTPUT OF HSFD OPERATOR TO A PRE-DETERMINED IMAGE RESOLUTION-TO-NOISE TRADEOFF

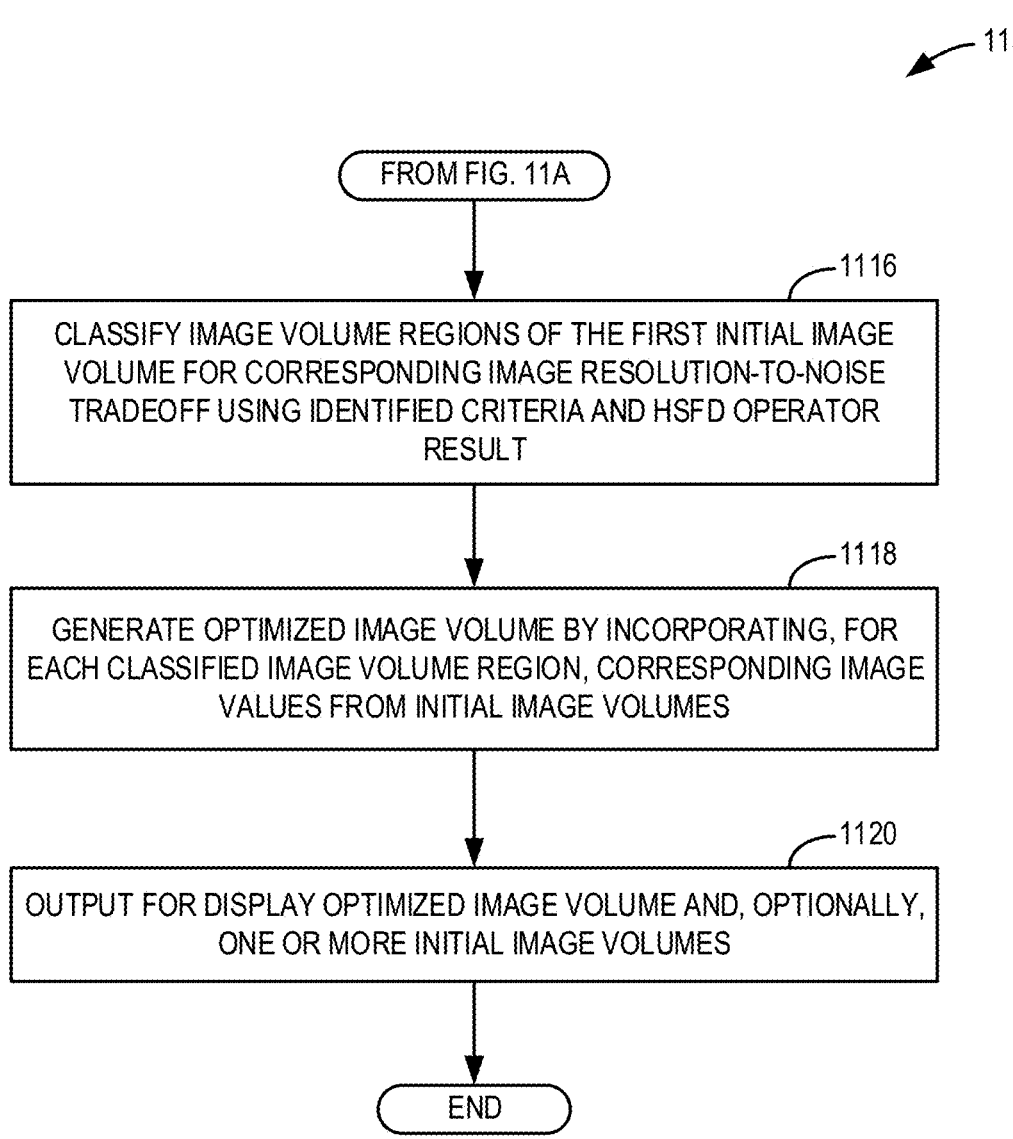

1100

FROM FIG. 11A

1116

CLASSIFY IMAGE VOLUME REGIONS OF THE FIRST INITIAL IMAGE VOLUME FOR CORRESPONDING IMAGE RESOLUTION-TO-NOISE TRADEOFF USING IDENTIFIED CRITERIA AND HSFD OPERATOR RESULT

1118

GENERATE OPTIMIZED IMAGE VOLUME BY INCORPORATING, FOR EACH CLASSIFIED IMAGE VOLUME REGION, CORRESPONDING IMAGE VALUES FROM INITIAL IMAGE VOLUMES

1120

OUTPUT FOR DISPLAY OPTIMIZED IMAGE VOLUME AND, OPTIONALLY, ONE OR MORE INITIAL IMAGE VOLUMES

END

FIG. 11B

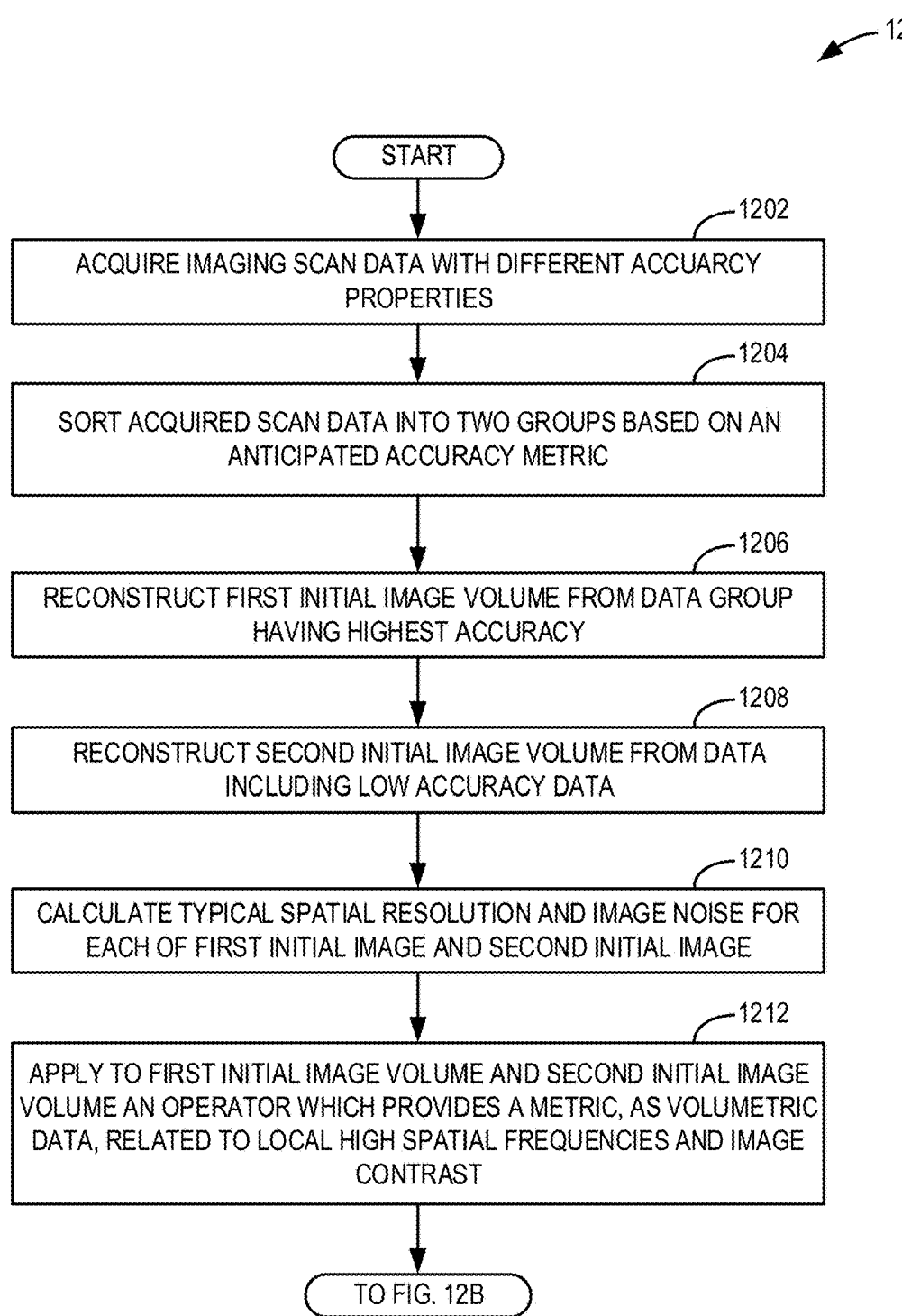

1200

START

1202
ACQUIRE IMAGING SCAN DATA WITH DIFFERENT ACCUARCY PROPERTIES

1204
SORT ACQUIRED SCAN DATA INTO TWO GROUPS BASED ON AN ANTICIPATED ACCURACY METRIC

1206
RECONSTRUCT FIRST INITIAL IMAGE VOLUME FROM DATA GROUP HAVING HIGHEST ACCURACY

1208
RECONSTRUCT SECOND INITIAL IMAGE VOLUME FROM DATA INCLUDING LOW ACCURACY DATA

1210
CALCULATE TYPICAL SPATIAL RESOLUTION AND IMAGE NOISE FOR EACH OF FIRST INITIAL IMAGE AND SECOND INITIAL IMAGE

1212
APPLY TO FIRST INITIAL IMAGE VOLUME AND SECOND INITIAL IMAGE VOLUME AN OPERATOR WHICH PROVIDES A METRIC, AS VOLUMETRIC DATA, RELATED TO LOCAL HIGH SPATIAL FREQUENCIES AND IMAGE CONTRAST

METHODS AND SYSTEMS FOR SELECTIVE RECOMBINATION OF RECONSTRUCTED IMAGE REGIONS

FIELD

Embodiments of the subject matter disclosed herein relate to non-invasive diagnostic imaging, and in particular to increasing accuracy of image reconstruction for nuclear medicine (NM) imaging systems.

BACKGROUND

Nuclear medicine (NM) imaging systems, such as positron emission tomography (PET) imaging systems and single photon emission computed tomography (SPECT) imaging systems, include multiple detectors or detector heads for detecting radiation emitted from within a subject in order to image the internal structure of the subject. For example, PET imaging systems acquire data that represent the distribution of positron-emitting nuclides within the body of a patient. When a positron interacts with an electron by annihilation, the entire mass of a positron-electron pair is converted into two 511-keV photons. The photons are emitted in opposite directions along a line of response (LOR). The PET imaging systems may include multiple detectors in a configuration such as a detector ring, and detectors of the detector ring that are positioned on both sides of the LOR may detect the photons. Coincidence occurs when these annihilation photons arrive and are detected at the detector elements at the same time. An image is then generated based on the acquired image data that includes the annihilation photon detection information. SPECT imaging systems acquire data that represents a distribution of a radioactive substance introduced into the subject, which may be absorbed in a target organ or area of a body of the subject. The radioactive substance emits photons, which are collimated and detected by a detector subsystem, such as a cadmium zinc telluride (CZT) detector. Detectors of the subsystem may generate output electrical signals from which three-dimensional (3D) images can be created, where the 3D images show a distribution of the radioactive substance in and around the target organ or area.

BRIEF DESCRIPTION

In one embodiment, a method comprises acquiring imaging scan data which includes data elements having different accuracy properties, sorting the imaging scan data into two or more different groups using an anticipated accuracy metric, reconstructing a first initial image volume from a first group of the two or more different groups, wherein the first group has a highest anticipated accuracy metric of the two or more different groups, reconstructing a second initial image volume from a combined data group, the combined data group comprising data of the first group and a second group of the two or more different groups, wherein the second group has a lower anticipated accuracy metric compared to the first group, applying a high spatial frequencies detection (HSFD) operator on the first initial image volume, identifying criteria that relate an output of the HSFD operator to a pre-determined image resolution-to-noise tradeoff, classifying image volume regions of the first initial image volume, where the image volume regions correspond to the pre-determined image resolution-to-noise tradeoff, generating an optimized image volume by incorporating, for each of the classified image volume regions, corresponding image values from the first initial image volume and the second initial image volume, and outputting the optimized image volume for display on a display device. In some embodiments, selective recombination may occur following reconstruction of images from different accuracy groups, while in other embodiments selective recombination may occur during image reconstruction.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIGS. 11A and 11B illustrate a flow chart of a first method for selective recombination of image regions from reconstructed images, according to embodiments of the disclosure;

FIGS. 12A and 12B illustrate a flow chart of a second method for selective recombination of image regions from reconstructed images, according to embodiments of the disclosure;

DETAILED DESCRIPTION

Figure 1:
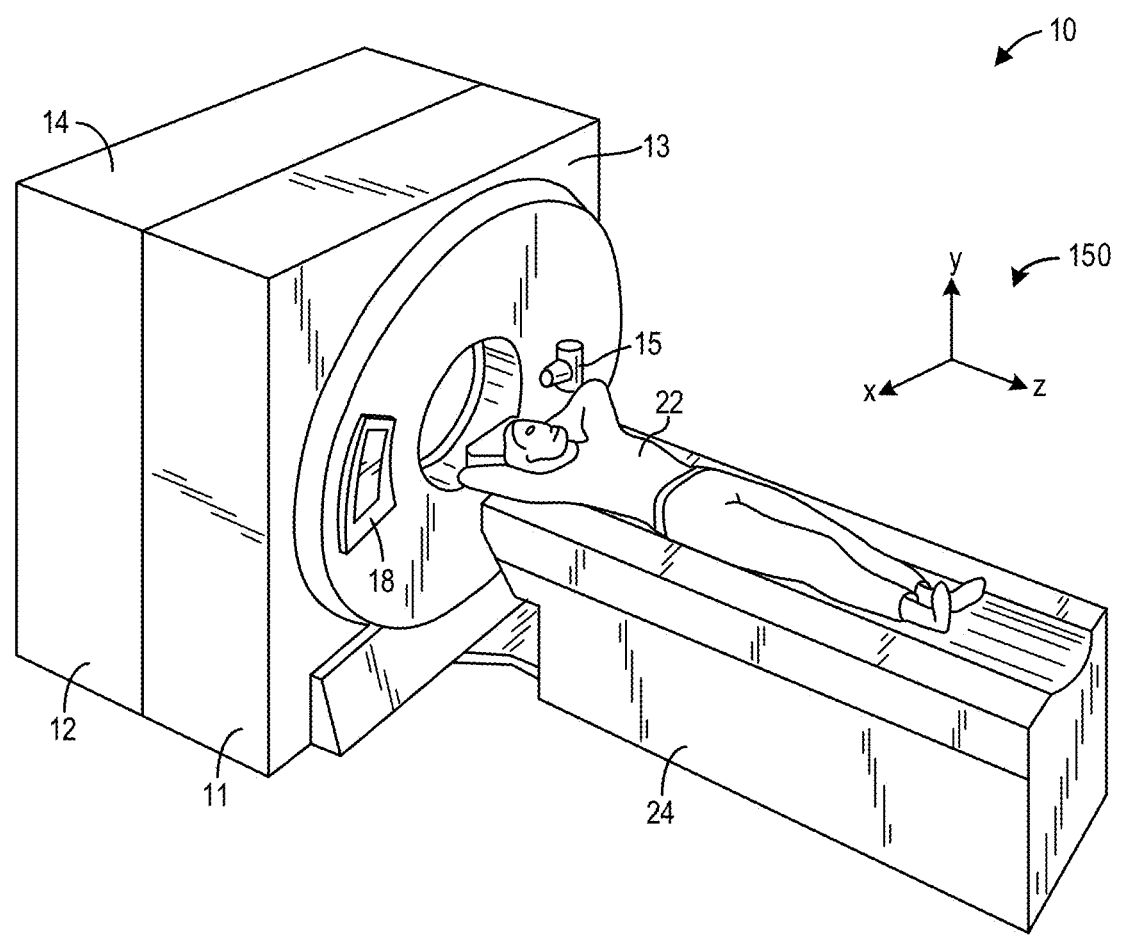
FIG. 1 is a pictorial view of an exemplary multi-modality imaging system according to an embodiment of the disclosure.

The following description relates to various embodiments of nuclear medicine (NM) imaging. In particular, systems and methods are provided for increasing an accuracy of images reconstructed from data captured via a NM imaging system, such as a SPECT imaging or a PET imaging system. In medical imaging, there are several known techniques that use image data with relatively high accuracy (e.g., in some features or characteristics) to increase accuracy of specific aspects of a reconstructed image quality of another type of related imaging data. For example, documented techniques describe the reconstruction of PET or SPECT data with the assistance of related CT or MRI image data. In another conventional technique, high quality PET images may be used to direct reconstruction of clinically associated SPECT data to achieve increased SPECT image quality. Such techniques can be applied within the tomographic reconstruction algorithms, or as a post-processing algorithm that works on the already reconstructed images.

Typically, in a medical imaging system, all or most of the acquired data elements (e.g., related to detected photons) have similar properties in terms of resolution and other accuracy characteristics. A large axial FOV PET imaging system, also referred to as a total-body or whole-body scanner, may enable high sensitivity per axial length, due to the ability to incorporate large angle variety of lines of response (LORs), compared to standard FOV PET imaging systems. In large axial field of view (FOV) PET imaging systems which use wide axial angles, different detected data elements can have significantly different accuracy properties. Therefore, it is possible to tailor reconstruction concepts of incorporating different data types to fit the different data properties of the large axial FOV PET imaging system. This advantage can contribute to low image noise over the scan duration. However, at the same time, the most oblique LORs may have an unfavorable influence on the image spatial resolution due to the parallax error and (in some situations) large contribution to the scatter and random fraction. An acceptance angle is the maximal azimuthal angle for which the LORs are still taken into the image reconstruction. In some practical acquisition settings, a less than maximum acceptance angle is used for image data capture, therefore some image data may be excluded from the image data capture. These considerations introduce a tradeoff between two main characteristics of large axial FOV PET scanners: sensitivity and spatial resolution. It is desirable to find new ways to utilize wide axial angles while maintaining high spatial resolution where it is relevant.

Described herein are systems and methods for selective recombination of reconstructed image regions, where selective recombination may occur during or following image reconstruction. Imaging scan data may be acquired from imaging devices such as a PET or a SPEC imaging system. The imaging scan data may be sorted into two or more groups based on an anticipated accuracy metric of each element. When selective recombination occurs during image reconstruction, the method may include reconstructing a high accuracy image from the high accuracy image data group, calculating image-based kernels for a guided hybrid-recon algorithm, selecting a second group, the second group having the next highest accuracy data of a set of image data groups, with respect to the high accuracy image data group, reconstructing an updated high accuracy image from the high accuracy image, the calculated image-based kernels, and the second group, and updating the calculated image-based kernels for the hybrid-recon algorithm, based on the updated high accuracy image. When selective recombination occurs following image reconstruction, the method may include reconstructing a first initial image volume from a data group of the two groups having a highest anticipated accuracy metric, reconstructing a second initial image volume from a data group of the two groups having a lower anticipated accuracy metric with respect to the first initial image volume, and selectively recombining reconstructed image data to generate a joint image volume having regions of high-resolution and high image noise, as well as regions with low-resolution and low image noise. High image noise in the regions having high-resolution is a tradeoff to maintain local high-resolution and to increase the resolution to noise ratio on selective image features.

Figure 2:
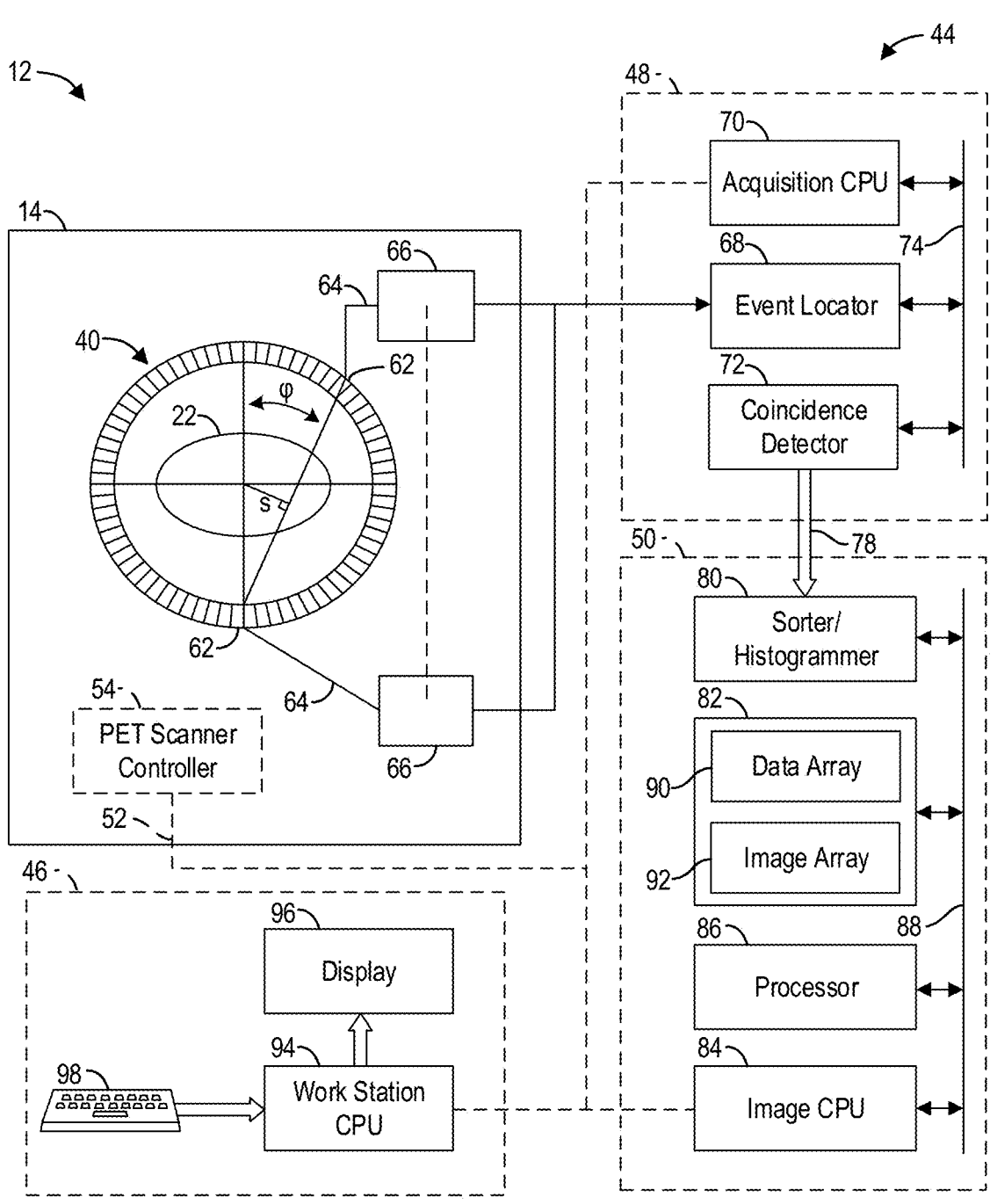
FIG. 2 is a block schematic diagram of an exemplary imaging system with a detector, which may be an example of the multi-modality imaging system of FIG. 1.
Figure 3:
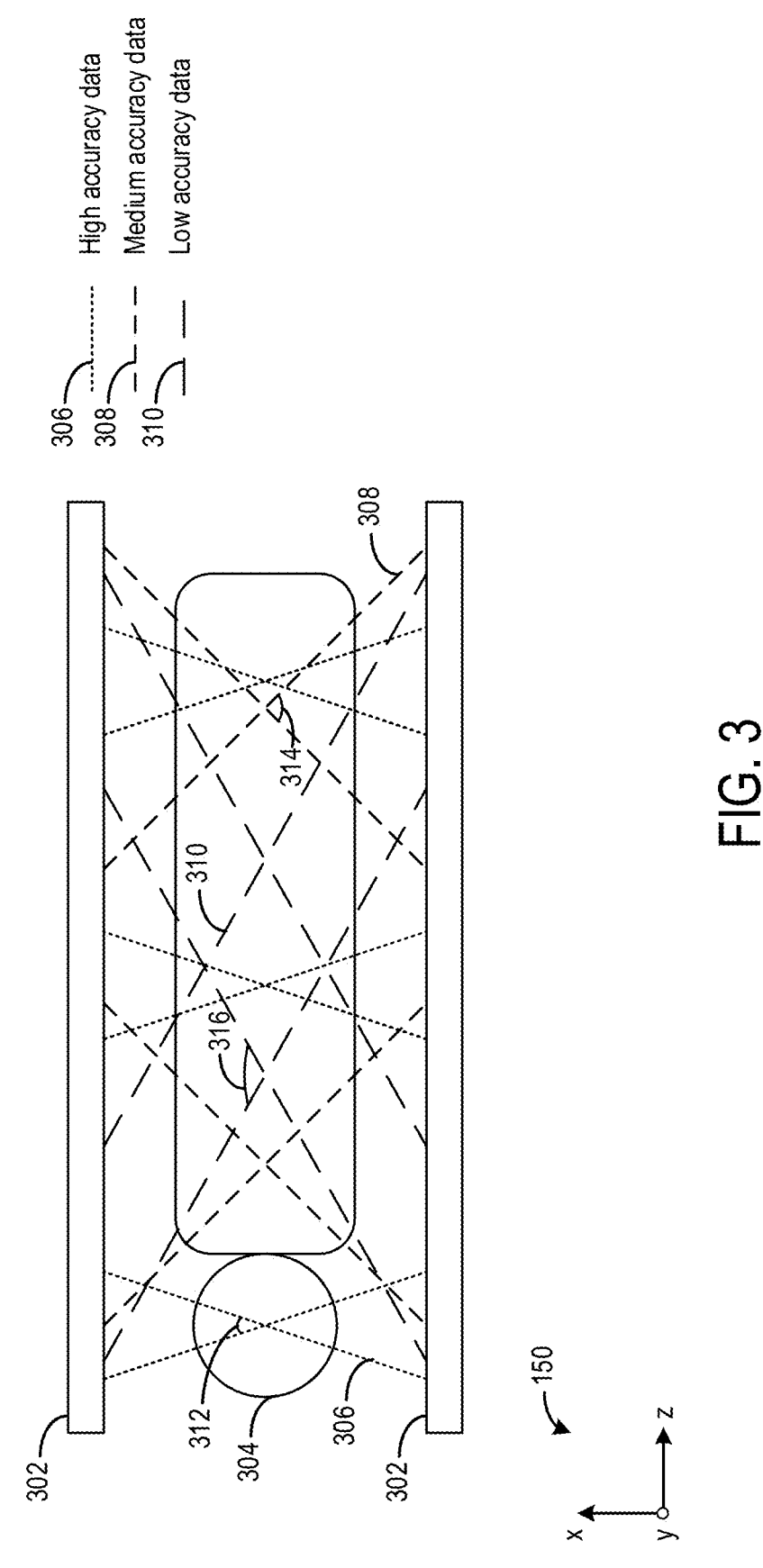
FIG. 3 is a pictorial view of a large axial field of view (FOV) PET imaging system, which may be an example of the imaging system of FIGS. 1 and 2.
Figure 4:
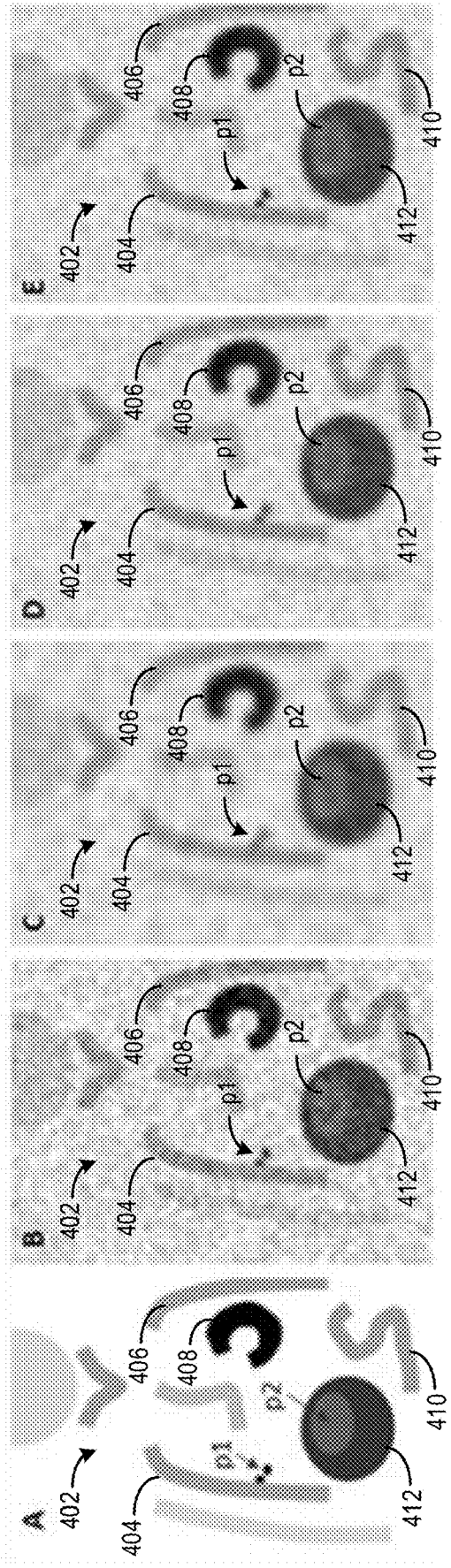
FIG. 4 shows cartoon examples of radiotracer distribution in a subject, which may represent images reconstructed using different image reconstruction methods, according to embodiments of the disclosure.
Figure 14:
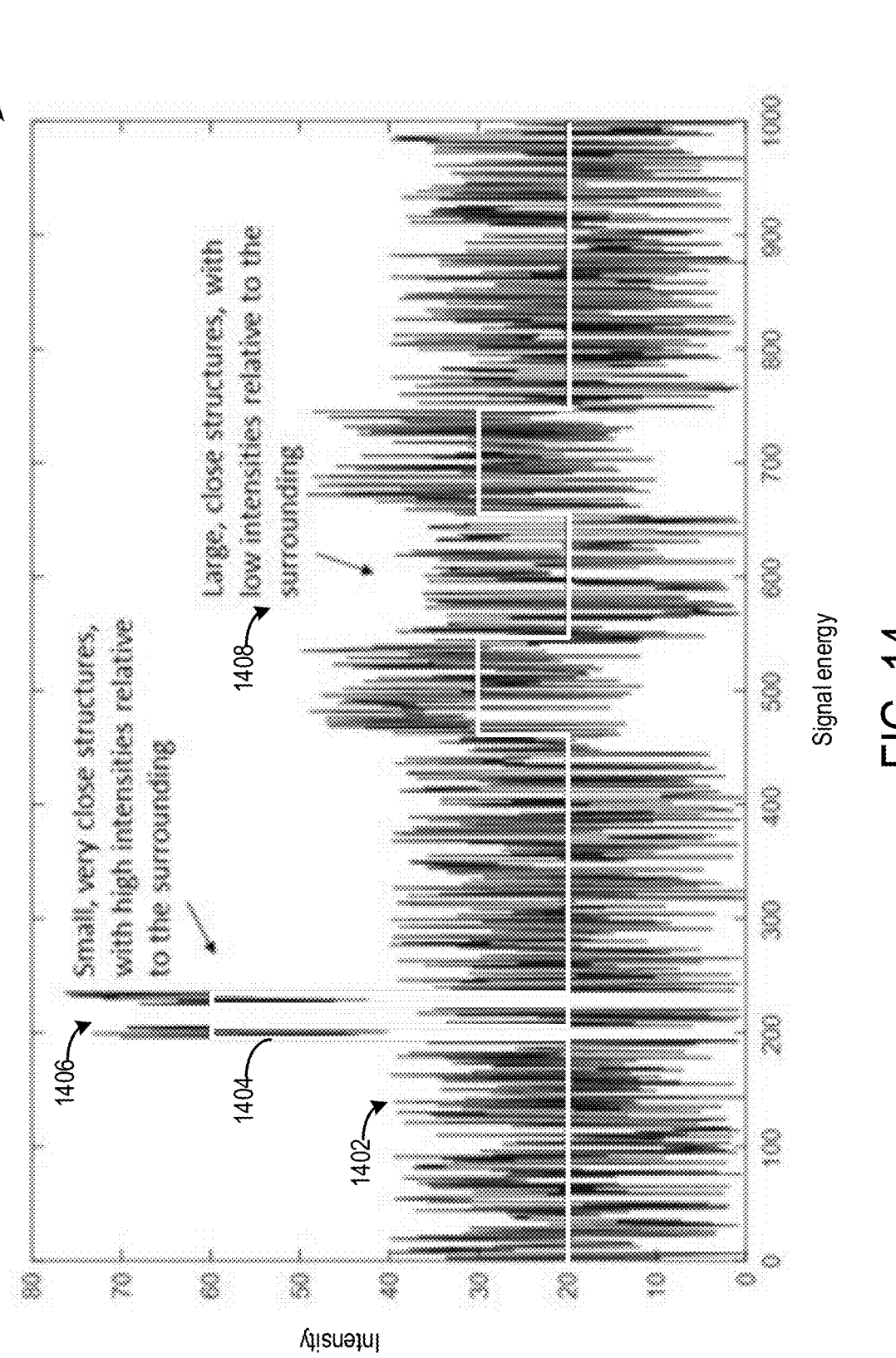
FIG. 14 is a graph of a synthetic simulation signal demonstrating a principle of improving overall contrast-to-noise ratio of a measured signal by automatically optimizing selective utilization of high-resolution and low-resolution data sampling, according to embodiments of the disclosure.
Figure 15:
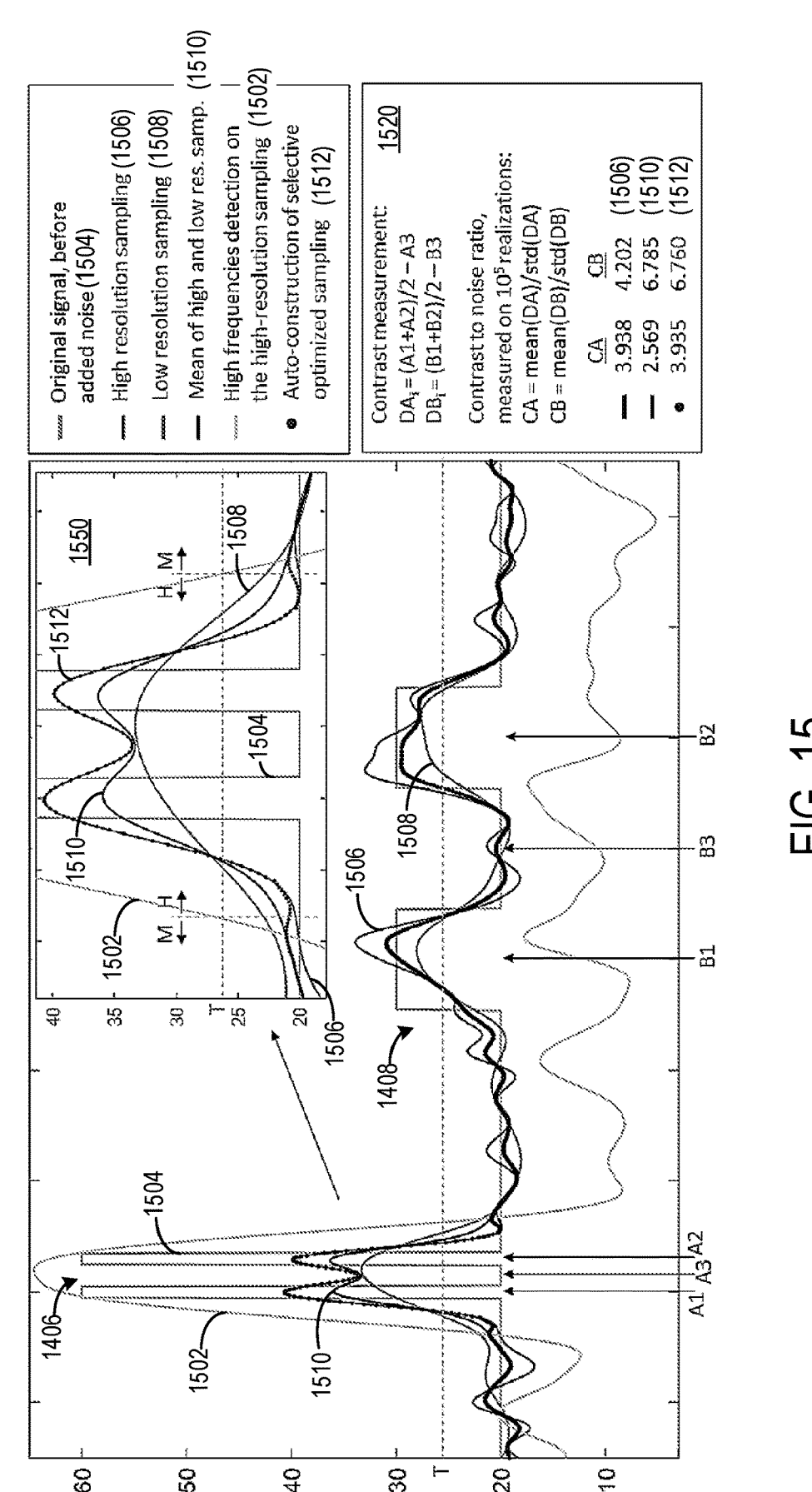
FIG. 15 shows samples of the synthetic simulation signal of FIG. 14 having different filters applied thereto, including a comparison of the contrast-to-noise ratio for each filtered sample, according to embodiments of the disclosure.

An example of a PET imaging system that may be used to acquire data from which images are reconstructed in accordance with the herein disclosed methods is shown in FIGS. 1 and 2. A PET imaging system may be configured as a large axial FOV PET imaging system which enables a high sensitivity due to an ability to incorporate large angle variety of LORs, as depicted in FIG. 3. While providing high sensitivity, oblique LORs of the large axial FOV PET imaging system may have an unfavorable influence on an image spatial resolution due to parallax error and, in some situations, large contribution to scatter and random fraction. FIG. 4 shows cartoon examples of radiotracer distribution in a subject as shown in images reconstructed using different image reconstruction methods, including a method for selective recombination of image regions. The method for selective recombination of image regions may be performed using two or more reconstructed images, as is further described with respect to FIGS. 11A-12B, and/or performed using iterative reconstruction, as is further described with respect to FIG. 13. Additional comparisons of reconstructed images which are reconstructed using selective recombination of regions and reconstructed images which are reconstructed from a single accuracy grouping are shown in FIGS. 5-10. FIG. 14 shows a graph of a synthetic simulation signal demonstrating the herein described principle of improving overall contrast-to-noise ratio of a measured signal by automatically optimizing selective utilization of high-resolution and low-resolution data sampling. FIG. 15 shows samples of the synthetic simulation signal of FIG. 14 having different filters applied thereto, including a comparison of the contrast-to-noise ratio for each filtered sample.

A multi-modality imaging system 10 is shown in FIGS. 1 and 2, and may be used to capture imaging data which is reconstructed, using the method for selective recombination described herein, to form reconstructed images having high accuracy and clarity, compared to images reconstructed using conventional image reconstruction methods. Multi-modality imaging system 10 may be any type of imaging system, for example, different types of medical imaging systems, such as a Positron Emission Tomography (PET), a Single Photon Emission Computed Tomography (SPECT), a Computed Tomography (CT), an ultrasound system, Magnetic Resonance Imaging (MRI), or any other system capable of generating tomographic images. The various embodiments are not limited to multi-modality medical imaging systems, but may be used on a single modality medical imaging system such as a stand-alone PET imaging system or a stand-alone SPECT imaging system, for example. Moreover, the various embodiments are not limited to medical imaging systems for imaging human subjects, but may include veterinary or non-medical systems for imaging non-human objects. FIG. 1 further includes an axis system 150 for reference. The y-axis may be a vertical axis (e.g., parallel to a gravitational axis), the x-axis may be a lateral axis (e.g., horizontal axis), and the z-axis may be a longitudinal axis, in one example. However, the axes may have other orientations, in other examples. The axis system 150 is further included in FIG. 3, for reference.

Referring to FIG. 1, the multi-modality imaging system 10 includes a first modality unit 11 and a second modality unit 12. The two modality units enable the multi-modality imaging system 10 to scan an object or patient in either or both of a first modality using the first modality unit 11 and a second modality using the second modality unit 12. The multi-modality imaging system 10 allows for multiple scans in different modalities to facilitate an increased diagnostic capability over single modality systems. In one embodiment, multi-modality imaging system 10 is a Computed Tomography/Positron Emission Tomography (CT/PET) imaging system, e.g., the first modality unit 11 is a CT imaging system and the second modality unit 12 is a PET imaging system. When configured as the CT/PET system, the multi-modality imaging system 10 is shown as including a gantry 13 representative of a CT imaging system and a gantry 14 that is associated with a PET imaging system. As discussed above, modalities other than CT and PET may be employed with the multi-modality imaging system 10.

The gantry 13 includes an x-ray source 15 that projects a beam of x-rays toward a detector array 18 on the opposite side of the gantry 13. Detector array 18 is formed by a plurality of detector rows (not shown) including a plurality of detector elements which together sense the projected x-rays that pass through a medical patient 22. Each detector element produces an electrical signal that represents the intensity of an impinging x-ray beam and hence allows estimation of the attenuation of the beam as it passes through the patient 22. During a scan to acquire x-ray projection data, gantry 13 and the components mounted thereon rotate about a center of rotation.

FIG. 2 is a block schematic diagram of the second modality unit 12 illustrated in FIG. 1, which is configured as a PET imaging system in accordance with an embodiment of the present disclosure, and is described as such herein. The PET imaging system includes a detector ring assembly 40 including a plurality of detector crystals. The PET imaging system also includes a controller 44, to control normalization and image reconstruction processes, and perform calibration. Controller 44 is coupled to an operator workstation 46. Controller 44 includes a data acquisition processor 48 and an image reconstruction processor 50, which are interconnected via a communication link 52. PET imaging system acquires scan data and transmits the data to data acquisition processor 48. The scanning operation is controlled from the operator workstation 46. The data acquired by the data acquisition processor 48 is reconstructed using the image reconstruction processor 50.

The detector ring assembly 40 includes a central opening, in which an object or patient, such as patient 22 may be positioned using, for example, a motorized table 24 (shown in FIG. 1). The motorized table 24 is aligned with the central axis of detector ring assembly 40. This motorized table 24 moves the patient 22 into the central opening of detector ring assembly 40 in response to one or more commands received from the operator workstation 46. A PET scanner controller 54, also referred to as the PET gantry controller, is provided (e.g., mounted) within PET system. The PET scanner controller 54 responds to the commands received from the operator workstation 46 through the communication link 52. Therefore, the scanning operation is controlled from the operator workstation 46 through PET scanner controller 54.

The detector ring assembly 40 includes a plurality of detector units. The detector unit may include a plurality of detectors, light guides, scintillation crystals and analog application specific integrated chips (ASICs). For example, the detector unit may include twelve SiPM devices, four light guides, 144 scintillation crystals, and two analog ASICs. During operation, when a photon collides with a crystal 62 on a detector ring assembly 40, it produces a scintillation event on the crystal. Each photomultiplier tube or photosensor produces an analog signal that is transmitted on communication line 64 when a scintillation event occurs. A set of acquisition circuits 66 is provided to receive these analog signals. Acquisition circuits 66 produce digital signals indicating the three-dimensional (3D) location and total energy of the event. The acquisition circuits 66 also produce an event detection pulse, which indicates the time or moment the scintillation event occurred. These digital signals are transmitted through a communication link, for example, a cable, to an event locator circuit 68 in the data acquisition processor 48.

The data acquisition processor 48 includes the event locator circuit 68, an acquisition CPU 70, and a coincidence detector 72. The data acquisition processor 48 periodically samples the signals produced by the acquisition circuits 66. The acquisition CPU 70 controls communications on a back-plane bus 74 and on the communication link 52. The event locator circuit 68 processes the information regarding each valid event and provides a set of digital numbers or values indicative of the detected event. For example, this information indicates when the event took place and the position of the scintillation crystal 62 that detected the event. An event data packet is communicated to the coincidence detector 72 through the back-plane bus 74. The coincidence detector 72 receives the event data packets from the event locator circuit 68 and determines if any two of the detected events are in coincidence. Coincidence is determined by a number of factors. First, the time markers in each event data packet are within a predetermined time period, for example, 12.5 nanoseconds, of each other. Second, the line-of-response (LOR) formed by a straight line joining the two detectors that detect the coincidence event which may pass through the field of view in the PET imaging system. Events that cannot be paired are discarded. Coincident event pairs are located and recorded as a coincidence data packet that is communicated through a physical communication link 78 to a sorter/histogrammer 80 in the image reconstruction processor 50.

The image reconstruction processor 50 includes the sorter/histogrammer 80. During operation, sorter/histogrammer 80 generates a data structure known as a histogram. A histogram includes a large number of cells, where each cell corresponds to a specific pair of detector crystals in the PET scanner. Because a PET scanner typically includes thousands of detector crystals, the histogram typically includes millions of cells. Each cell of the histogram also stores a count value representing the number of coincidence events detected by the pair of detector crystals for that cell during the scan. At the end of the scan, the data in the histogram is used to reconstruct an image of the patient. The completed histogram containing all the data from the scan is commonly referred to as a "result histogram." The term "histogrammer" generally refers to the components of the scanner, e.g., processor and memory, which carry out the function of creating the histogram.

The image reconstruction processor 50 also includes a memory module 82, an image CPU 84, an array processor 86, and a communication bus 88. During operation, the sorter/histogrammer 80 counts all events occurring along each projection ray and organizes the events into 3D data. This 3D data, or sinogram, is organized in one exemplary embodiment as a data array 90. Data array 90 is stored in the memory module 82. The communication bus 88 is linked to the communication link 52 through the image CPU 84. The image CPU 84 controls communication through communication bus 88. The array processor 86 is also connected to the communication bus 88. The array processor 86 receives data array 90 as an input and reconstructs images in the form of image array 92. Resulting image arrays 92 are then stored in memory module 82.

The images stored in the image array 92 are communicated by the image CPU 84 to the operator workstation 46. The operator workstation 46 includes a CPU 94, a display device 96, and an input device 98. The CPU 94 connects to communication link 52 and receives inputs, e.g., user commands, from the input device 98. The input device 98 may be, for example, a keyboard, mouse, a touch-screen panel, and/or a voice recognition system, and so on. Through input device 98 and associated control panel switches, the operator can control the operation of the PET imaging system and the positioning of the patient 22 for a scan. Similarly, the operator can control the display of the resulting image on the display device 96 and can perform image-enhancement functions using programs executed by the workstation CPU 94.

A PET imaging system, such as the PET imaging system of FIGS. 1 and 2, may be configured as a large axial FOV PET imaging system, an example of which is shown in FIG. 3. A large axial FOV PET imaging system 300 provides different groups of LORs having different physical spatial accuracy. As described with respect to FIGS. 1-2, a PET imaging system (e.g., the large axial FOV PET imaging system 300) includes a detector ring assembly 302 (shown as a cross section of two parallel lines in FIG. 3) for capturing imaging data. A subject 304 may be positioned within the detector ring assembly 302 during image data capture. Short dashed lines 306 illustrate LORs that intersect at a first angle 312 and enable capture of high accuracy data. Medium dashed lines 308 illustrate LORs that intersect at a second angle 314 and enable capture of medium accuracy data. Long dashed lines 310 illustrate LORs that intersect at a third angle 316 and enable capture of low accuracy data. In the example of FIG. 3, as the LORs are more oblique relative to x-z plane (with respect to the axis system 150) the data accuracy is statistically lower due to the physical properties of the large axial FOV PET imaging system 300, the subject 304, and radiation emitted by a radiotracer distributed in the subject 304. For example, the level of accuracy depends in general on known properties such as imaging system geometry and physics, photon energy and their statistics, and/or detection timing.

An algorithmic method is described herein to increase accuracy and clarity of image characteristics of NM imaging systems, such as large axial FOV PET imaging systems (e.g., as described with respect to FIG. 3) and SPECT imaging systems, where data elements with different accuracy exist. The main concept is to sort acquired image data, such as projection bins or individual LORs, into different groups based on their anticipated accuracy, for example, depending on the axial LOR angle (e.g., the angle at which LORs of the same type intersect). In some embodiments, data elements of the acquired image data may be sorted into different groups based on the anticipated accuracy metric of each data element, where the different data groups are defined by a range of axial LOR angles and data elements may have different accuracy metric values. For example, a first group with a highest anticipated accuracy metric may include data elements within a first range of axial LOR angles, where the first range of axial LOR angles includes axial LOR angles that are greater than 0 degrees and less than 45 degrees. A second group with a medium anticipated accuracy metric (e.g., less than the highest anticipated accuracy metric of the first group) may include data elements within a second range of axial LOR angles, different from the first range. For example, the second range of axial LOR angles may include axial LOR angles that are greater than 45 degrees and less than 90 degrees. A third group with a lower anticipated accuracy metric (e.g., less than the medium anticipated accuracy metric of the second group) may include data elements within a third range of axial LOR angles, different from the first rang and the second range. For example, the third range of axial LOR angles may include axial LOR angles that are greater than 90 degrees. The different sorted data groups are used to generate reconstructed images with different properties such as spatial resolution, contrast, and noise. Reconstructed images from the different sorted data groups can be combined selectively, based on local image features, to achieve a single image with preferred optimization, such as image resolution and contrast-to-noise ratio. Alternatively, the combination of different properties can be done directly during an iterative image reconstruction, still based on local image features.

FIG. 4 illustrates an example implementation of the algorithmic method for selective recombination as described above and further described herein with respect to FIGS. 11A-13. FIG. 4 shows cartoon illustrations 400 of a distribution of radiotracer in a subject 402, where different anatomies of the subject 402 are illustrated as simplified shapes. The illustration of the subject 402 includes a first lung region 404, a second lung region 406, a heart 408, an intestine 410, and a liver 412. Cartoon A illustrates a true distribution of radiotracer in the subject 402, where radiation activity is shown in each of the aforementioned anatomies. Two regions of interest are indicated in cartoon A: p1, which includes two close, small lesions in the first lung region 404 which have high contrast relative to surrounding background, and p2, which includes a large area of radiotracer uptake variation in the liver 412 with relatively low contrast relative to the rest of the liver 412. Cartoons B, C, D, and E each include the subject 402 with the same anatomy as described with respect to cartoon A, some elements of which may not be labeled for clarity.

Imaging data of the subject 402 may be captured using a large axial FOV PET imaging system (e.g., as described with respect to FIG. 3) or a SPECT imaging system, as described with respect to FIGS. 1-2. The imaging data may then be sorted into two or more groups based on accuracy properties of the imaging data. For example, when the data is captured using the large axial FOV PET imaging system, imaging data captured using the LORs and axial LOR angle associated with high accuracy data may be sorted into a first group, and imaging data captured using the LORs and axial LOR angle associated with low accuracy data may be sorted into a second group. Due to the nature of the imaging system (e.g., physics and geometry), different regions of the subject 402 may be captured with different accuracy. A presence of one or more lesions in the lungs may be common, however identification and diagnosis of the one or more lesions may be improved (e.g., a time taken to identify and diagnose may be decreased and an accuracy of identification and diagnosis may be increased) by generating images of the lung which have high-resolution (e.g., high visual clarity of the lesions) and a high contrast-to-noise ratio. Additionally, radiotracer distribution and radiation activity in the liver 412 may differ in different regions of the liver 412 depending on structures of the liver 412. For diagnostic purposes, as the liver 412 is a relatively large organ, it may not be desired to visualize the liver 412 with a high-resolution (e.g., the same resolution used to visualize small lesions in the lung). Image noise does exist when imaging the liver 412, and it is desirable to have a high contrast-to-noise ratio in reconstructed images of the liver 412 to assist in differentiating regions of the liver 412 having different radiation activity from the rest of the liver 412 and from background of the image. Thus, different parameters (e.g., resolution and contrast-to-noise ratio) may be desired to enable fast and accurate image reconstruction for different regions and anatomies of a single subject. The method is described herein with respect to regions of interest in the liver and lung, however the method may be applied to other anatomies, as well as other subjects to be imaged, for which different parameters are desired for different regions, without departing from the scope of the present disclosure.

In some conventional embodiments, different images may be reconstructed for each region of the subject which demands different parameters, such as resolution and contrast-to-noise ratio. For example, cartoon B is a first reconstructed image which is reconstructed from the first group (e.g., the high accuracy data) with statistically random noise. The liver 412, the heart 408, the intestine 410, the first lung region 404, and the second lung region 406 are reconstructed with relatively high-resolution, compared to cartoon A. The region of interest p1 (e.g., the two lesions) are also reconstructed with relatively high-resolution, which may enable clear visualization and differentiation of the two lesions from background of the first image. The statistically random noise of cartoon B is relatively high image noise, which may make it challenging to visualize and/or differentiate regions with low contrast, such as the region of interest p2 in the liver 412 from the rest of the liver 412. Cartoon B may thus be an appropriate reconstruction of the high accuracy data into an image of the region of interest p1, and may not be an appropriate reconstruction of the high accuracy data into an image of the region of interest p2.

Cartoon C is a second reconstructed image which is reconstructed from the second group (e.g., the low accuracy data) with random noise, which is un-correlated to noise of cartoon B. In some embodiments, cartoon C may be reconstructed from the low accuracy data, while in other embodiments, cartoon C may be reconstructed from a combination of all image data, including the low accuracy data and the high accuracy data. Cartoon C appears blurry compared to cartoon B and cartoon A, illustrating that cartoon C has low-resolution data reconstruction. The region of interest p1 (e.g., the two lesions) is reconstructed with relatively low-resolution and the lesions are challenging to differentiate from the first lung region 404 and from background of cartoon C. The region of interest p2 is more differentiated from the rest of the liver 412, compared to differentiation of the region of interest p2 in cartoon B, and is closer in likeness to differentiation of the region of interest p2 in cartoon A. Thus, cartoon C may be an appropriate reconstruction of low accuracy data into an image of the region of interest p2, and may not be an appropriate reconstruction of the low accuracy data into an image of the region of interest p1.

In some embodiments, both the first image reconstructed from high accuracy data (e.g., cartoon B) and the second image reconstructed from low accuracy data (e.g., cartoon C) may be output to aid in visualization and diagnosis of the regions of interest. However, generating and outputting multiple separate images may be high demand on a processor and a memory of a device (e.g., the image reconstruction processor 50 and memory module 82 of FIG. 2), especially if more than two images are generated to provide desirable reconstructed images for more than two regions of the subject. Further, it may be challenging to reference and navigate among multiple images during diagnosis. Thus, a method is desired which incorporates high accuracy data and low accuracy data into a single reconstructed image.

A conventional method for single image reconstruction, wherein a single reconstructed image includes all of the regions of interest in a desirable resolution, may include combining a low-resolution reconstructed image (e.g., cartoon C) and a high-resolution reconstructed image (e.g., cartoon B) to form a mean reconstructed image which is an average of the low-resolution reconstructed image and the high-resolution reconstructed image. Cartoon D is an example of a mean image formed by combining cartoon B and cartoon C. In cartoon D, clarity and differentiation of the region of interest p2 of the liver 412 is increased, with respect to cartoon C and cartoon B. However, the region of interest p1 of the two lesions is still blurry compared to cartoon B, which reduces both a resolution and a quantitative value (e.g., by measuring a maximum value of each lesion) of accuracy of cartoon D. Combining images which are reconstructed from high-resolution data and low-resolution data may provide a mean image with some desired parameters for some regions and undesired parameters for other regions. Alternatively, none of the regions may be reconstructed with desired parameters and all may be reconstructed with an average of the parameters.

Herein described is a method for providing desired parameters for each region in a single image. The method includes automatically detecting fine structure regions in the imaging data using a dedicated algorithm, as further described herein with respect to FIGS. 11A-15, and embedding high-resolution image values in the fine structure regions. For example, the dedicated algorithm may be applied to a reconstructed image which is reconstructed from high accuracy image data (e.g., cartoon B), low accuracy image data (e.g., cartoon C), or all image data. Application of the dedicated algorithm results in automatic detection of regions for which high spatial resolution and/or a high contrast-to-noise ratio may be desired, as well as detection of regions for which low-resolution may be allowed (e.g., high-resolution is not desired). This generates an optimized image which includes the regions of interest generated with parameters which are desirable for each region of interest. For example, image data which generates the region of interest p1 at a high-resolution may be different from (e.g., sorted into a different accuracy group than) image data which generates the region of interest p2 at a high-resolution. Both of these image data may be used to generate the optimized image to provide the region of interest p1 and the region of interest p2 at high-resolution and high contrast-to-noise ratio.

Cartoon E is an example of an optimized image that is generated by selectively combining image data captured of the subject 402. For example, cartoon E may be generated by selectively combining cartoon B and cartoon C using the algorithm further described herein. Cartoon E is formed of a first set of image data of cartoon B which includes the two lesions of the region of interest p 1 reconstructed at a high-resolution, and is otherwise formed of a second set of image data of cartoon C. Cartoon E shows the region of interest p1 with a clarity (e.g., high-resolution) which is comparable to the resolution of the region of interest p1 in cartoon B (e.g., generated from high accuracy image data). Cartoon E also shows the region of interest p2 with a contrast-to-noise ratio which is comparable to the contrast-to-noise ratio of the region of interest p2 in cartoon C (e.g., generated from low accuracy data). Compared to cartoon D (e.g., generated as a mean of cartoon B and cartoon C), cartoon E has higher image noise in some areas, however an overall contrast-to-noise ratio is increased in cartoon E. In this way, selective reconstruction of image data enables clear visualization and differentiation of the two regions of interest in a single image. The method is described with respect to the illustrations 400 of FIG. 4 as an example depiction of selective reconstruction, and will be further described herein with respect to additional image examples.

FIGS. 5-10 include example reconstructed images which are reconstructed from clinical data using conventional image reconstruction methods, and example reconstructed images which are reconstructed from clinical data using the selective image reconstruction method described herein. As further described with respect to FIGS. 11A-11B, the method for selective reconstruction may include selective combination of high accuracy data and low accuracy data as a post-processing algorithm, after image reconstruction steps are completed. Variations of the method of FIGS. 11A-11B are described with respect to FIGS. 12A-12B and 13, where selective recombination may be performed by processing low accuracy image data as well as high accuracy image data, or performing selective recombination during image reconstruction, respectively. Unless stated otherwise, any of the methods described with respect to FIGS. 11A-13 may be used to generate at least one of the reconstructed images shown in FIGS. 5-10. Before describing the methods of FIGS. 11A-13, conventional methods for image reconstruction are briefly described, for comparison.

Figure 8:
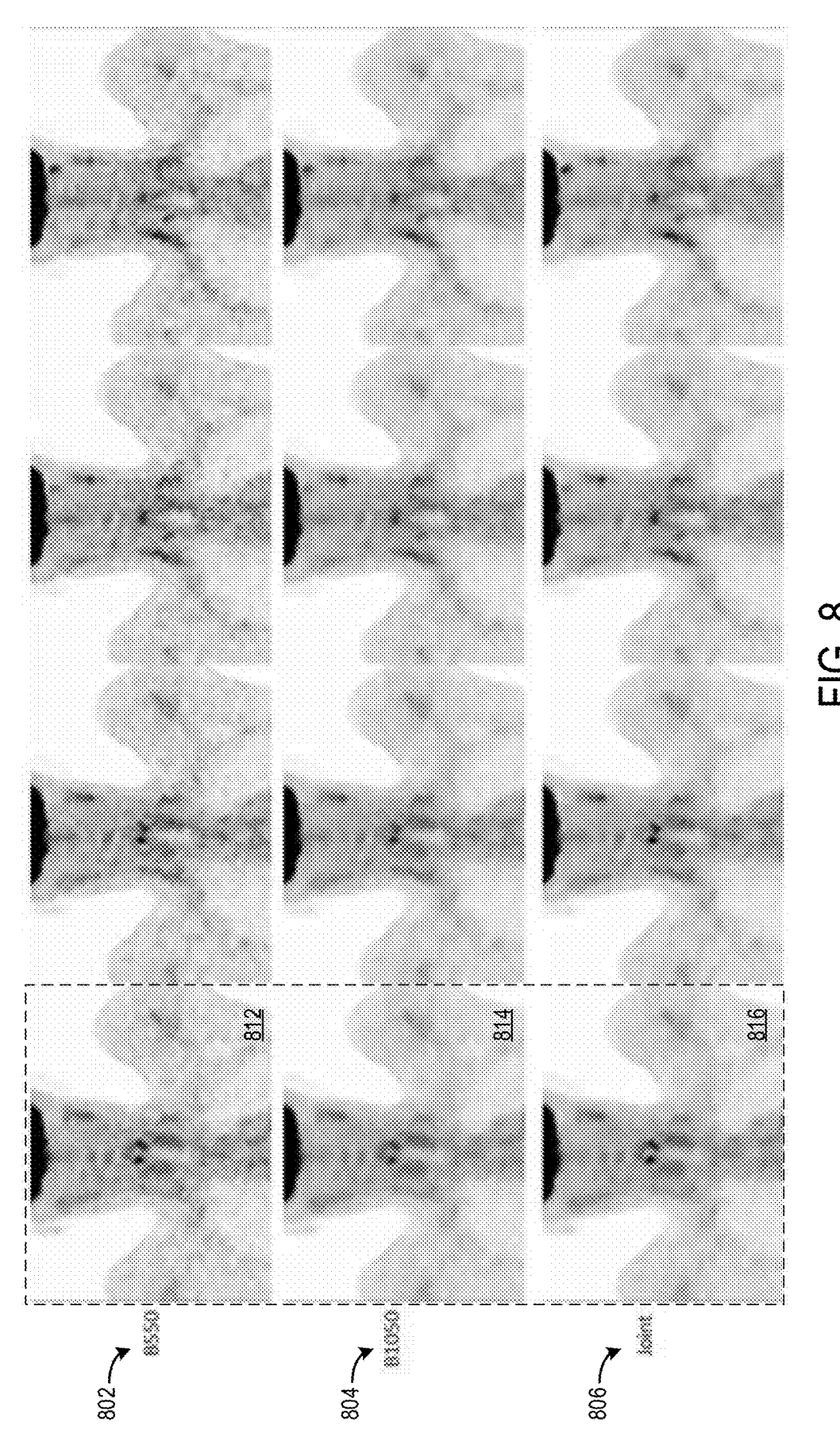
FIG. 8 is a series of neck images reconstructed using single accuracy grouping and reconstructed using selective recombination of regions, according to embodiments of the disclosure.
Figure 9:
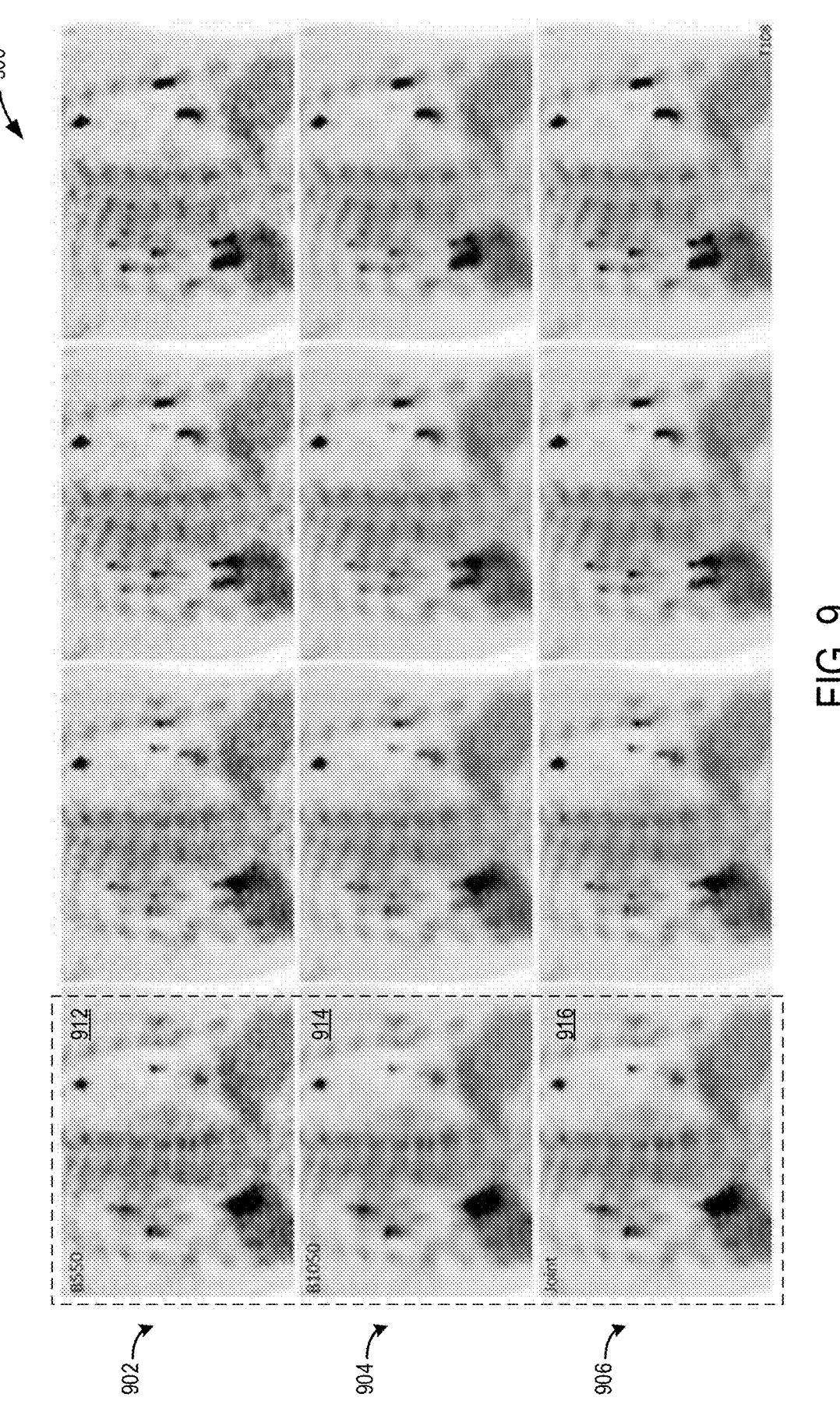
FIG. 9 is a series of ribcage images reconstructed using single accuracy grouping and reconstructed using selective recombination of regions, according to embodiments of the disclosure.
Figure 10:
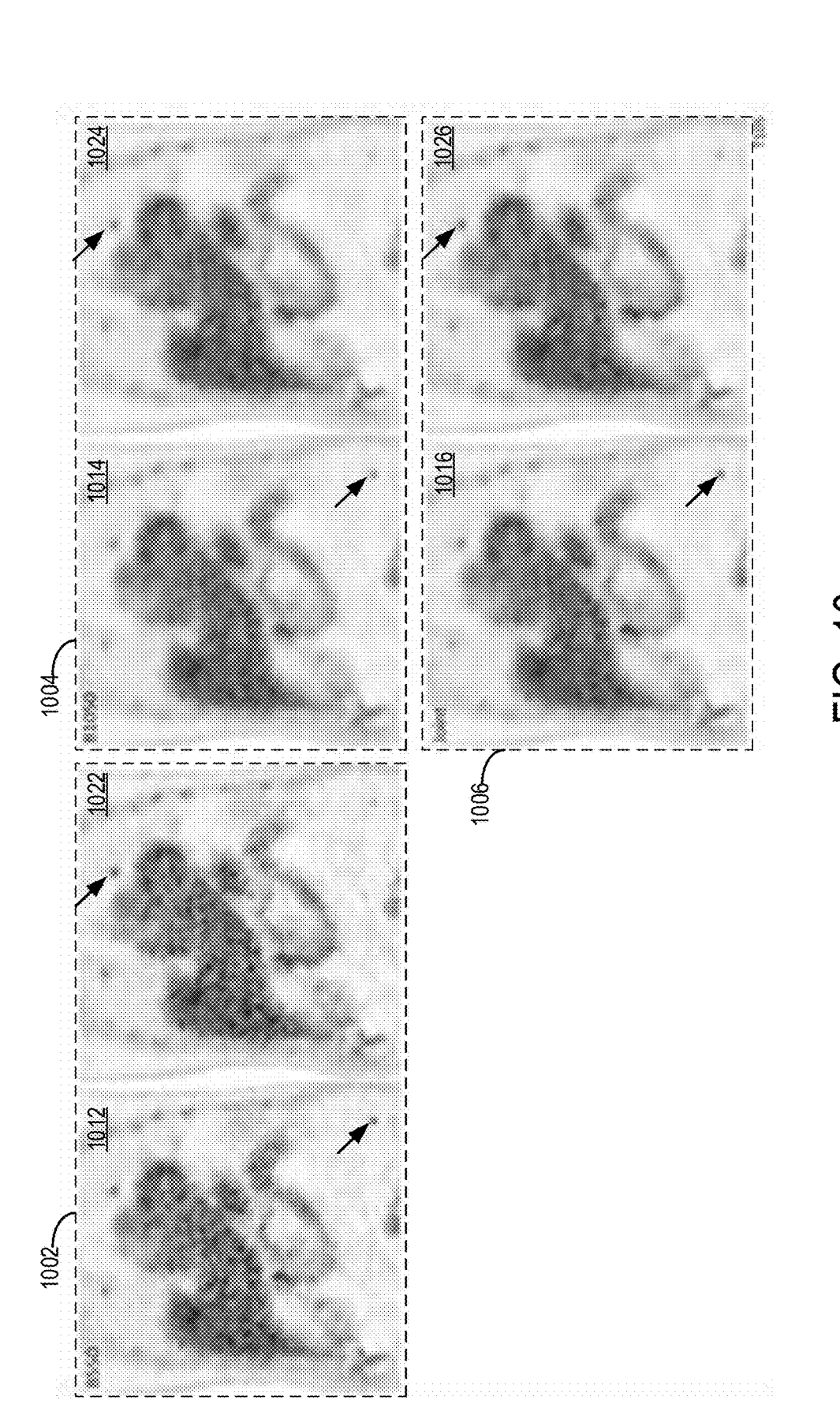
FIG. 10 is a series of stomach images reconstructed using single accuracy grouping and reconstructed using selective recombination of regions, according to embodiments of the disclosure.

A first example of a conventional method used to reconstruct image data includes reconstructing raw image data from a PET imaging system (e.g., the PET imaging system of FIGS. 1-3) using Q.Clear and two different beta (β) values to reconstruct two images with different properties (e.g., image noise and clarity/resolution). Briefly, Q.Clear is a block sequential regularized expectation maximization (BS-REM) penalized likelihood (PL) reconstruction algorithm for PET. In the BSREM PL reconstruction algorithm, the beta value controls a relative strength of a regularizing term, relative to data statistics. The regularizing term helps to balance data fidelity and image smoothness, ensuring an accuracy of the reconstructed image while reducing noise and artifacts. The regularizing term may be adjusted to increase as image noise increases, thus reducing an objective function, which has the effect of controlling (e.g., decreasing) image noise. A high beta value (e.g., 950) may result in a high regularizing term, and thus low image noise, and a low beta value (e.g., 450) may result in a low regularizing term, and thus high image noise. An image reconstructed using a small beta value (e.g., 450) may have high lesion enhancement (e.g., high accuracy/high-resolution of a region of interest), but may also have high image noise. An image reconstructed using a large beta value (e.g., 950) may have low lesion enhancement (e.g., low accuracy/low-resolution of a region of interest), but may have low image noise. Described another way, the beta value controls how much emphasis is placed on enforcing image smoothness. In the examples described herein with respect to FIGS. 5-7, a first beta value is 450 and a second beta value is 950. In the examples of FIGS. 8-10, the first beta value is 550 and the second beta value is 1050.

As described above, it may be desirable to visualize small features of one or more regions of interest with high contrast, and visualize large features of one or more regions of interest (e.g., the same or different from regions of interest of the small features) with low contrast in a single image. Thus, a method provided for selective reconstruction of image data into a single image which optimizes feature parameters is desired. As described herein, the method (e.g., described with respect to FIGS. 11A-13) includes generating a joint image from selective recombination of reconstructed data which is sorted into different accuracy groups. With respect to the conventional method used by Q.Clear, the method described herein may enable reconstruction of a single image in which lesions have a conspicuity characteristic of a low beta value, and the single image has an image noise level characteristic of a high beta value. In this way, a single image may be reconstructed which includes desirable levels of image accuracy and image clarity (e.g., low noise) for different regions of the subject shown in the image.

Various PET-CT reconstruction techniques already include ways to identify which LORs are more valuable than others and decide whether to include them or not in the reconstruction process. In addition, known iterative PET reconstruction with corrections in the loop can gives more weight to the LORs which may provide a higher anticipated accuracy metric value—both for properties like timing resolution (narrow kernel will give more weight to fewer voxels) and spatial resolution (if point spread function (PSF) is used during reconstruction, then LORs with poor resolution will not contribute much to the convergence). However, these weighting schemes are not specific or dependent on local image features, and therefore their benefits may be challenging to optimize. The difference and novelty in the proposed method is that the combination and weighting of reconstructed data with different physical properties directly depend on analyzed local image features and related predetermined criteria. Thus, increased clinical image optimization can be achieved, directly related to the clinical diagnostic requirements.

Figure 5:
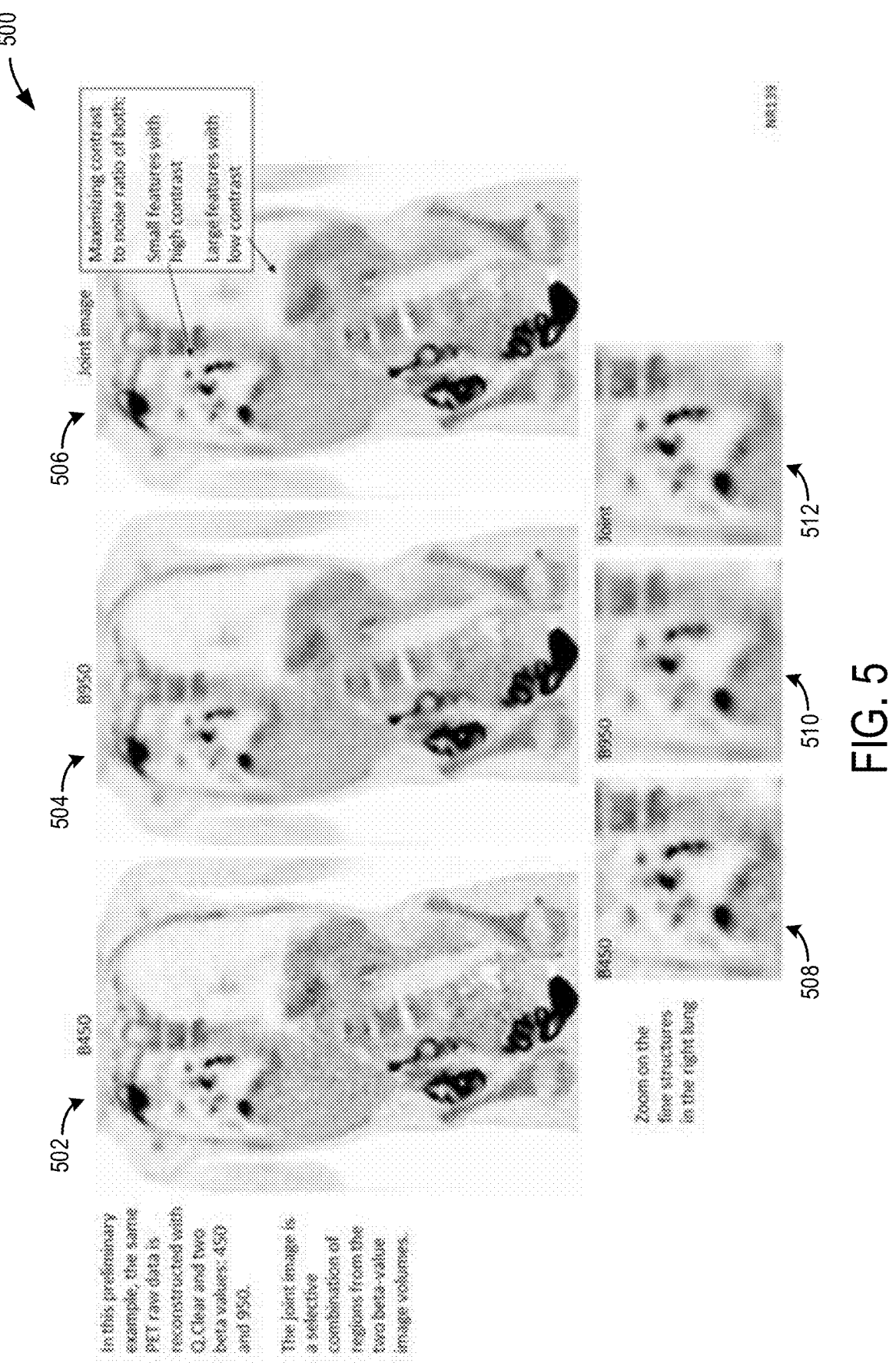
FIG. 5 is a series of torso images reconstructed using single accuracy grouping and reconstructed using selective recombination of regions, according to embodiments of the disclosure.

FIG. 5 shows a first series of images 500, including a first image 502 which is generated by reconstructing raw PET image data using the Q.Clear method with a beta value of 450, a second image 504 which is generated by reconstructing raw PET image data using the Q.Clear method with a beta value of 950, and a third image 506 which is generated using the method for selective recombination of reconstructed image regions (e.g., a method described with respect to FIGS. 11A-13). The first series of images 500 show different reconstructions of a torso of the same subject.

The first series of images 500 further includes zoomed-in views of a right lung region of the subject, including a fourth image 508 which is an expanded view of the first image 502, a fifth image 510 which is an expanded view of the second image 504, and a sixth image 512 which is an expanded view of the third image 506.

As described herein, the Q.Clear method uses beta values to control an adjustment of image noise in image reconstruction. Thus, the first image 502 which has a beta value of 450 has a higher lesion enhancement (e.g., high accuracy/high-resolution of a region of interest) and high image noise, compared to the second image 504 which has a beta value of 950. This can be visualized in detail by comparing the fourth image 508 and the fifth image 510 of fine structures of the right lung of the subject. The third image 506 is a joint image generated by selective recombination of regions from the first image 502 and the second image 504. As shown in the third image 506 and the sixth image 512, the joint image maintains conspicuity of lesions in the right lung region, which is provided by the low beta value (e.g., the first image 502, beta value of 450), while also providing low image noise of the high beta value (e.g., the second image 504, beta value 950). As described with respect to FIG. 4, it may be desirable to visualize large organ structures, like the liver, with relatively low contrast, and visualize small features, like lesions in the lung, with high contrast. The joint image (e.g., the third image 506) maximizes a contrast-to-noise ratio of both the small features and the large features (e.g., large organ structure). In this way, different structures of the subject are reconstructed in a single image which optimizes image parameters, including image noise, contrast-to-noise ratio, and image clarity/resolution, for different image regions/anatomies.

Figure 6:
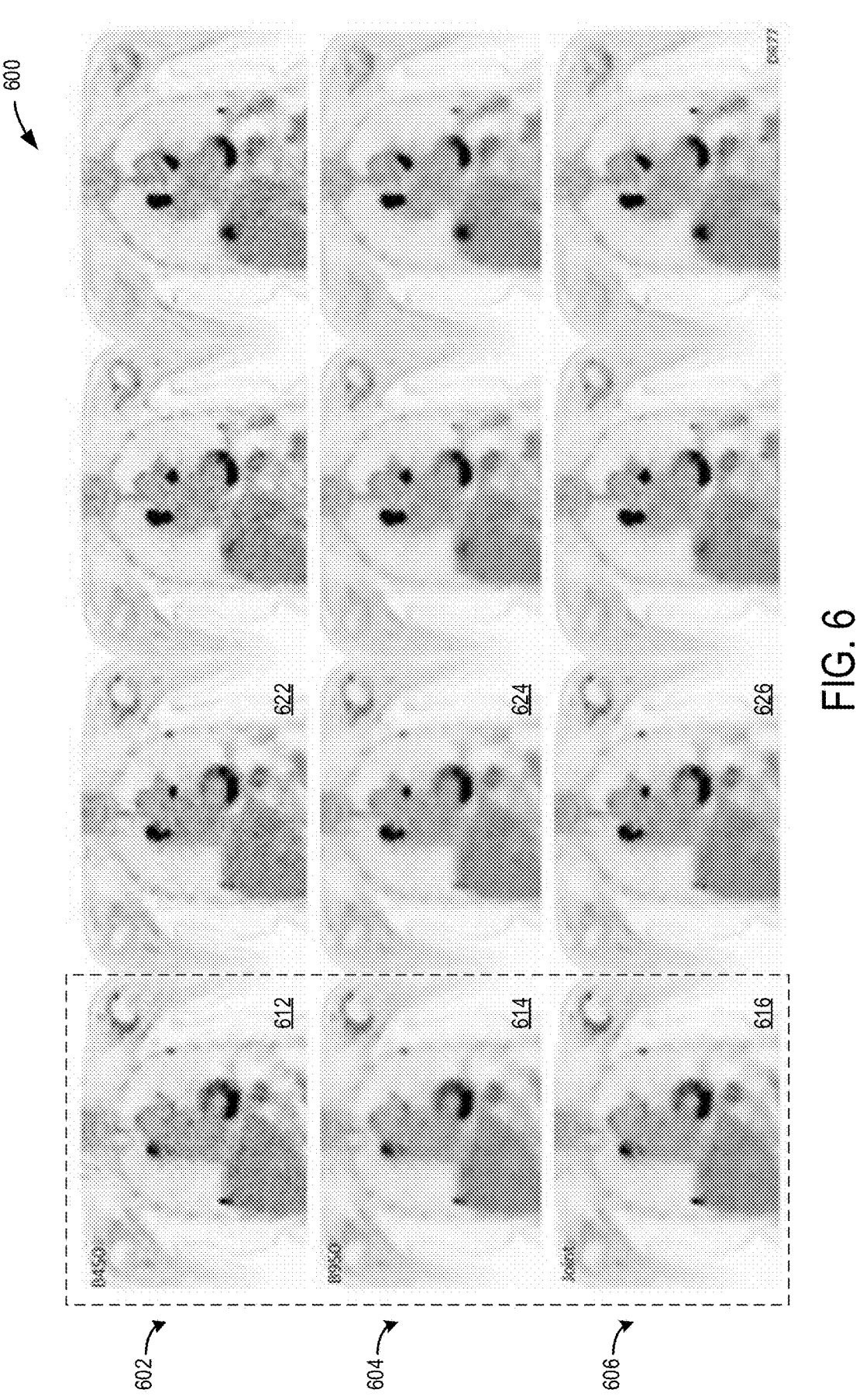
FIG. 6 is a first series of chest images reconstructed using single accuracy grouping and reconstructed using selective recombination of regions, according to embodiments of the disclosure.

FIG. 6 shows a second series of images 600 of chest region of a patient, including a first group of images 602 which are generated by reconstructing raw PET image data using the Q.Clear method with a beta value of 450, a second group of images 604 which is generated by reconstructing raw PET image data using the Q.Clear method with a beta value of 950, and a third group of images 606 which is generated using the method for selective recombination of reconstructed image regions. The second series of images 600 may be grouped by columns, for visualization purposes. For example, a first image 612 of the first group of images 602 may be a first iteration of Q.Clear image reconstruction using the beta value of 450, a second image 614 of the second group of images 604 may be a first iteration of Q.Clear image reconstruction using the beta value of 950, and a third image 616 of the third group of images 606 may by generated by a first iteration of selective reconstruction using one of the methods described herein with respect to FIGS. 11A-13, where the third image 616 may be at least partially reconstructed from the first image 612 and the second image 614. As described above, images reconstructed using the Q.Clear method with a relatively small beta value (e.g., 450) may have high lesion enhancement and high image noise. Images reconstructed using the Q.Clear method with a relatively large beta value (e.g., 950) may have low lesion enhancement and low image noise. Joint images (e.g., the third group of images 606) may maintain a lesion conspicuity of the low beta value and the low image noise of the high beta value.

Figure 7:
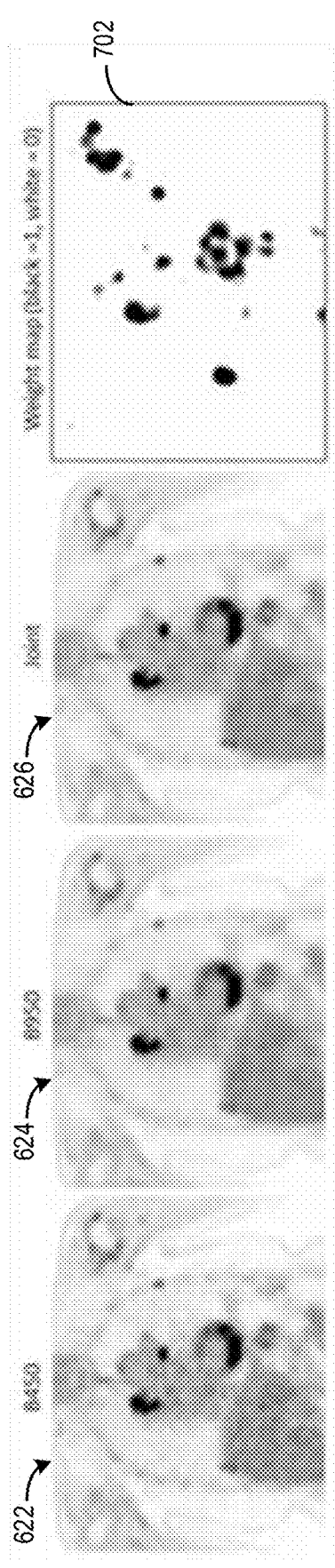
FIG. 7 is a second series of chest images reconstructed using single accuracy grouping and reconstructed using selective recombination of regions, according to embodiments of the disclosure.

FIG. 7 shows a selection of image data 700 including images from the second series of images 600 of FIG. 6, and an image joining weight map 702. The selection of image data 700 of images include a fourth image 622, a fifth image 624, and a sixth image 626 of FIG. 6, where the fourth image

622 is included in the first group of images 602, the fifth image 624 is included in the second group of images 604, and the sixth image 626 is included in the third group of images 606. A method for selective reconstruction as described with respect to FIGS. 12A and 12B includes generating a joint image volume by combining weighted image data of a first initial image volume (e.g., generated from high accuracy data) and a second initial image volume (e.g., generated from low accuracy data). Local weights applied to each of the first initial image volume and the second initial image volume may be based on pre-determined criteria related to a volumetric data metric of local high spatial frequencies and image contrast, as well as information about spatial resolution and image noise. In the example of FIG. 7, the fourth image 622 may be an example of the first initial image volume, and the fifth image 624 may be an example of the second initial image volume. The image joining weight map 702 shows weighting of image data used to generate the joint image (e.g., the sixth image 626), where regions in black are regions for which high data accuracy is desired. Selective recombination of the fourth image 622 and the fifth image 624 according to the image joining weight map 702 may result in generation of the sixth image 626. In this way, the sixth image 626 includes regions of high accuracy, regions of low accuracy, regions of high image noise, and regions of low image noise, as determined by the method for selective recombination as described with respect to FIGS. 12A and 12B.

FIG. 8 shows a third series of images 800 of a neck region of a patient, including a first group of images 802 which are generated by reconstructing raw PET image data using the Q.Clear method with a beta value of 550, a second group of images 804 which is generated by reconstructing raw PET image data using the Q.Clear method with a beta value of 1050, and a third group of images 806 which is generated using the method for selective recombination of reconstructed image regions. The third series of images 800 may be grouped by columns, for visualization purposes. For example, a first image 812 of the first group of images 802 may be a first iteration of Q.Clear image reconstruction using the beta value of 550, a second image 814 of the second group of images 804 may be a first iteration of Q.Clear image reconstruction using the beta value of 1050, and a third image 816 of the third group of images 806 may be generated by a first iteration of selective reconstruction using one of the methods described herein with respect to FIGS. 11A-13, where the third image 816 may be at least partially reconstructed from the first image 812 and the second image 814. As described above, images reconstructed using the Q.Clear method with a relatively small beta value (e.g., 550) may have high lesion enhancement and high image noise. Images reconstructed using the Q.Clear method with a relatively large beta value (e.g., 1050) may have low lesion enhancement and low image noise. Joint images (e.g., the third group of images 806) may maintain a lesion conspicuity of the low beta value and the low image noise of the high beta value.

FIG. 9 shows a fourth series of images 900 of a ribcage region of a patient, including a first group of images 902 which are generated by reconstructing raw PET image data using the Q.Clear method with a beta value of 550, a second group of images 904 which is generated by reconstructing raw PET image data using the Q.Clear method with a beta value of 1050, and a third group of images 906 which is generated using the method for selective recombination of reconstructed image regions. The fourth series of images 900 may be grouped by columns, for visualization purposes.

For example, a first image 912 of the first group of images 902 may be a first iteration of Q.Clear image reconstruction using the beta value of 550, a second image 914 of the second group of images 904 may be a first iteration of Q.Clear image reconstruction using the beta value of 1050, and a third image 916 of the third group of images 906 may be generated by a first iteration of selective reconstruction using one of the methods described herein with respect to FIGS. 11A-13, where the third image 916 may be at least partially reconstructed from the first image 912 and the second image 914. As described above, images reconstructed using the Q.Clear method with a relatively small beta value (e.g., 550) may have high lesion enhancement and high image noise. Images reconstructed using the Q.Clear method with a relatively large beta value (e.g., 1050) may have low lesion enhancement and low image noise. Joint images (e.g., the third group of images 906) may maintain a lesion conspicuity of the low beta value and the low image noise of the high beta value.

FIG. 10 shows a fourth series of images 1000 of a stomach region of a patient, including a first group of images 1002 which are generated by reconstructing raw PET image data using the Q.Clear method with a beta value of 550, a second group of images 1004 which is generated by reconstructing raw PET image data using the Q.Clear method with a beta value of 1050, and a third group of images 1006 which is generated using the method for selective recombination of reconstructed image regions. A first image 1012 of the first group of images 1002 may be a first iteration of Q.Clear image reconstruction using the beta value of 550, a second image 1014 of the second group of images 1004 may be a first iteration of Q.Clear image reconstruction using the beta value of 1050, and a third image 1016 of the third group of images 1006 may be generated by a first iteration of selective reconstruction using one of the methods described herein with respect to FIGS. 11A-13, where the third image 1016 may be at least partially reconstructed from the first image 1012 and the second image 1014.

As described above, images reconstructed using the Q.Clear method with a relatively small beta value (e.g., 550) may have high lesion enhancement and high image noise. Images reconstructed using the Q.Clear method with a relatively large beta value (e.g., 1050) may have low lesion enhancement and low image noise. Joint images (e.g., the third group of images 906) may maintain a lesion conspicuity of the low beta value and the low image noise of the high beta value. For example, the first image 1012 and a fourth image 1022 of the first group of images 1002 each include a lesion, as indicated by an arrow. The second image 1014 corresponds to the first image 1012, and a fifth image 1024 of the second group of images 1004 corresponds to the fourth image 1022. Each of the second image 1014 and the fifth image 1024 also include the lesion, as indicated by the arrow, however lesion enhancement in the second image 1014 and the fifth image 1024 is less than lesion enhancement in the first image 1012 and the fourth image 1022, respectively. Image noise in the second image 1014 and the fifth image 1024 is less than image noise in the first image 1012 and the fourth image 1022, respectively. The third image 1016 is formed via selective recombination of the first image 1012 and the second image 1014, and the sixth image 1026 is formed via selective recombination of the fourth image 1022 and the fifth image 1024. The third image 1016 and a sixth image 1026 of the third group of images 1006 each include the respective lesion depicted with high lesions enhancement (e.g., characteristic of the respective image from the first group of images 1002) and low image noise (e.g., characteristic of the respective image from the second group of images 1004). In this way, regions of interest, such as lesions, may be depicted with high accuracy and clarity.

FIGS. 11A and 11B show a flow chart of a method 1100 for selective recombination of reconstructed image regions to form a single reconstructed image which has desirable image parameters for different regions of the image. The method 1100 may be used to generate images in FIGS. 5-10, specifically the third image 506 and the sixth image 512 of FIG. 5, and images of the third group of images 606, 806, 906, and 1006 of FIGS. 6-10. The method 1100 is described with regard to the systems and components of FIGS. 1-3, though it should be appreciated that the method 1100 may be implemented with other systems and components without departing from the scope of the present disclosure. Method 1100 may be implemented as executable instructions in memory, such as non-transitory memory of the memory module 82, and executed by one or more processors such as the data acquisition processor 48 and the image reconstruction processor 50, as an illustrative and non-limiting example.

At 1102, the method 1100 includes acquiring imaging scan data which includes data elements having different accuracy properties. In embodiments where the method 1100 is implemented by an imaging system, such as the PET imaging system of FIGS. 1-3, acquiring scan data may include performing an image scan and/or retrieving scan data from a memory/database of the imaging system. In other embodiments, the method 1100 may be implemented by a device other than the imaging system. For example, the method 1100 may be implemented by a workstation which is communicably coupled to a database which stores scan data, and acquiring scan data at 1102 may include sending a request to the database to retrieve and send to the workstation the scan data. The scan data includes data elements of different accuracies. For example, as described with respect to FIG. 3, when the scan data is captured by a large axial FOV PET imaging system, the scan data includes data having different physical spatial accuracies (e.g., low accuracy, medium accuracy, and high accuracy), as captured by LORs intersecting at different axial angles. The scan data may be organized based on individual LORs and/or binned projections.

At 1104, the method 1100 includes sorting the imaging scan data into two or more different groups using an anticipated accuracy metric. For example, as described with respect to FIG. 3, data captured along a first set of LORs which intersect at a first angle may be sorted into a first group of relatively high accuracy, data captured along a second set of LORs which intersect at a second angle (e.g., greater than the first angle) may be sorted into a second group of medium accuracy, and data captured along a third set of LORs which intersect at a third angle (e.g., greater than the second angle) may be sorted into a third group of relatively low accuracy. An axial angle or range of axial angles of LOR intersection which differentiate among low, medium, and high accuracy data may be pre-determined and/or may be configurable, such as in response to a user input.

The imaging scan data may additionally or alternatively be sorted for different accuracy levels based on several properties besides the range of axial angles. For example, imaging scan data may be sorted based on anticipated random or scatter probabilities. In another embodiment, detected coincidence photons may be sorted by their energy, where photons within a first, narrow energy window around a peak energy may be considered as most accurate, on average, and photons with energy in a lower energy window (e.g., further from the peak energy than the first, narrow energy window) may be considered as less accurate due to a potential low scattering angle. Less accurate data (e.g., from the lower energy window) may be used in selective recombination of reconstructed image regions when high sensitivity is demanded. This method for sorting imaging scan data may be used in list-mode reconstruction, as further described herein. Additionally, this method may be used to sort PET data and/or SPECT data.

In some embodiments, an imaging device (e.g., the large axial FOV PET imaging system of FIG. 3) may include detector elements having different capabilities. For example, a first detector element of the imaging device may have physical time of flight (TOF) detection capability, and a second detector element of the imaging device may not have this capability. In such cases, imaging scan data may be sorted by a timing accuracy of the LOR (e.g., with TOF information or without).

The method 1100 may be implemented in cardiac PET imaging. In this implementation, imaging scan data may be sorted by accuracy based on time gated bins. For example, cardiac cycle phases which are known to be associated with lesser average movement (e.g., beating of the heart) may be used as high accuracy data, and phases which are known to be associated with highest average movement may be used as low accuracy data. This sorting option may be particularly desirable in advanced applications of simultaneously imaging both the myocardium and the main arteries at the heart vicinity.

The method 1100 may also be implemented in a SPECT configured to perform cardiac scans, where high-resolution data may be of 180-degree acquisition, with detectors close to the heart side. Relatively low-resolution data may be of 360-degree acquisition captured by a 360-degree detector arrangement. This may be relevant to imaging systems having a ring-like configuration of detectors which orbit the imaging subject (e.g., StarGuide™ from GE HealthCare).

The above described methods for sorting imaging scan data are provided as non-limiting examples. For all of the above described methods, as well as other methods which may be used to sort imaging scan data, the acquired high-resolution data may span a complete sampling for image reconstruction. The low-resolution data set itself may be of non-complete sampling, if the low-resolution data is to be combined (e.g., selectively reconstructed) together with the high-resolution data set to generate a combined image (e.g., a mean-resolution image, an optimized image volume as further described herein).

At 1106, the method 1100 includes reconstructing a first initial image volume from a first group of the two or more different groups, wherein the first group has a highest anticipated accuracy metric of the two or more different groups. For example, the first initial image volume may be reconstructed from data in the first group, as sorted at 1104. As described above, an anticipated accuracy for data elements may be determined using a respective axial LOR angle, where data captured along a first set of LORs which intersect at a first angle may be sorted into a first group of relatively high accuracy, data captured along a second set of LORs which intersect at a second angle (e.g., greater than the first angle) may be sorted into a second group of medium accuracy, and so on. Examples of a first initial image volume are shown in FIGS. 5-10 as a first image or group of images (e.g., 502, 602, 802, 902, 1002). The first initial image volume may be reconstructed via conventional image reconstruction methods.

At 1108, the method 1100 includes reconstructing a second initial image volume from a combined data group, the combined data group comprising data of the first group and a second group of the two or more different groups, wherein the second group has a lower anticipated accuracy metric, compared to the first group. The highest accuracy data may be the data used to reconstruct the first initial image. The lower accuracy data may be data of a group which is less accurate than data of the first group. In embodiments where data is sorted into more than two groups at 1104, the second initial image volume may be formed of data from the highest accuracy data group and data from the next most accurate data group. For example, the combined data group may include some or all of the data in the first group and some or all of the data in the second group (e.g., medium accuracy). Alternatively, the second initial image volume may be formed of data from the highest accuracy data group and data from the lowest accuracy data group. For example, the combined data group may include some or all of the data in the first group and some or all of the data in the third group (e.g., lowest accuracy). In further embodiments, the second initial image volume may be formed of all scan data from all of the data groups (e.g., all accuracies). Examples of a second initial image volume are shown in FIGS. 5-10 as a second image or group of images 604, 804, 904, and 1004. The second initial image volume may be reconstructed via conventional image reconstruction methods. The first initial image volume reconstructed at 1106 and the second initial image volume reconstructed at 1108 have different image parameters, including different resolution-to-noise tradeoffs (e.g., the first initial image volume may have a higher resolution and higher noise, compared to the second initial image volume).

In some embodiments where the scan data is sorted into more than two groups at 1104, the method 1100 optionally includes, at 1110, generating one or more additional reconstructed initial image volumes from the combined data of the first group and corresponding additional data groups of the two or more different groups, the corresponding additional data groups having further lower anticipated accuracy metric values, compared to the first group and the second group. For example, when the scan data is sorted into three accuracy groups (e.g., the first group of high accuracy data, the second group of medium accuracy data, and the third group of low accuracy data), the second initial image volume may be reconstructed using the first group and the second group, and a third initial image volume may be reconstructed using the first group and the third group. Operation 1110 may be repeated to generate a number of initial image volumes which is equal to a number of groups into which the scan data has been sorted. Each of the resulting initial image volumes has different image parameters (e.g., resolution-to-noise tradeoff).

At 1112, the method 1100 includes applying a high spatial frequencies detection (HSFD) operator on the first initial image volume reconstructed at operation 1106. The HSFD operator may be based on various known image processing and analysis techniques. For example, the HSFD operator may implement a Laplacian-of-Gaussian filter kernel in the following way. The HSFD operator may determine a kernel using equation 1:

$$g = -\left(\frac{x^2}{s^4} - \frac{1}{s^2}\right) * \exp\left(\frac{x^2}{2*s^2}\right) \tag{1}$$

where x refers to an image pixel index range (e.g., around a center of a determined 3D-box, for which x=0 is at a center), and s is a predetermined distribution width parameter. The HSFD operator may convolve 3D image data with the determined filter kernel g, take the absolute value of the resulting data, and smooth the absolute value of the resulting data with a pre-determined Gaussian filter. The HSFD operator may compare smoothed data to a pre-determined threshold, where values that are greater than the threshold are related to regions indicting fine image structures (e.g., high spatial frequencies) and values equal to or less than the threshold are related to low spatial frequencies. In other embodiments, the HSFD operator may be constructed with additional mathematical formulas, such as various wavelet technique, or machine-learning techniques for computer-vision tasks. Applying the HSFD operator to the initial image volume with the highest accuracy results in a HSFD operator result. The HSFD operator result, generated by applying the HSFD operator to the first initial image volume, may include information about image spatial frequencies and image contrast. In this way, the HSFD operator incorporates the resolution-to-noise metric in a single function (e.g., a Gaussian filter on the absolute values of the convolution with Laplacian-of-Gaussian kernel with two pre-determined width parameters. Further detail is described with respect to FIGS. 14 and 15.

At 1114, the method 1100 includes identifying criteria that relate an output of the HSFD operator to a pre-determined image resolution-to-noise tradeoff. For example, the preferred image resolution-to-noise tradeoff may be a ratio which states a desirable amount of image noise per area of the image. The criteria may include, for example, an image value of a lesion-like image structure, a value of background (e.g., non-lesion-like image structures), local noise, and so on. The criteria may include other variables which relate the information about image spatial frequencies and image contrast to the preferred image resolution-to-noise tradeoff.

At 1116, the method 1100 includes classifying image volume regions of the first initial image volume which correspond to the pre-determined image resolution-to-noise tradeoff using identified criteria and the HSFD operator result. This may include, for example, identifying regions of clinical interest within the image (e.g., regions which may include lesions or other abnormalities) where high-resolution and low noise is desirable. This may further include identifying regions where medium to high noise is acceptable (e.g., regions which are not of clinical interest).

At 1118, the method 1100 includes generating an optimized image volume by incorporating, for each of the classified image volume regions, corresponding image values from the first initial image volume and the second initial image volume. Operation 1118 further includes applying smooth image value transitions on region boundaries. For example, image values used to generate the optimized image volume may be taken from regions of the first initial image volume, the second initial image volume, and any additional initial image volumes (e.g., generated at operation 1110). Each of the initial image volumes have different image resolution-to-noise tradeoffs. By selectively combining classified image volume regions from different initial image volumes, the optimized image volume may include a variety of resolution-to-noise tradeoffs within the optimized image. For example, with reference to FIG. 4, image data which generates the region of interest p1 with a desirable image resolution-to-noise tradeoff may be sourced from a first initial image (e.g., cartoon B) and image data which generates the region of interest p2 with a desirable resolution-to-noise tradeoff may be sourced from a second initial image (e.g., cartoon C).

At 1120, the method 1100 includes outputting the optimized image volume for display on a display device. Optionally, one or more of the initial image volumes may also be output for display on the display device. For example, the optimized image and one or more of the initial image volumes may be output for display on the display device 96 of FIG. 2.

The method 1100 performs selective combination of high accuracy data and low accuracy data as a post-processing algorithm, after reconstruction steps are completed. Variations of the method 1100 are described with respect to FIGS. 12A-12B and 13, where selective recombination may be performed by processing low accuracy image data as well as high accuracy image data, or performing selective recombination during image reconstruction, respectively.

Figure 12B:
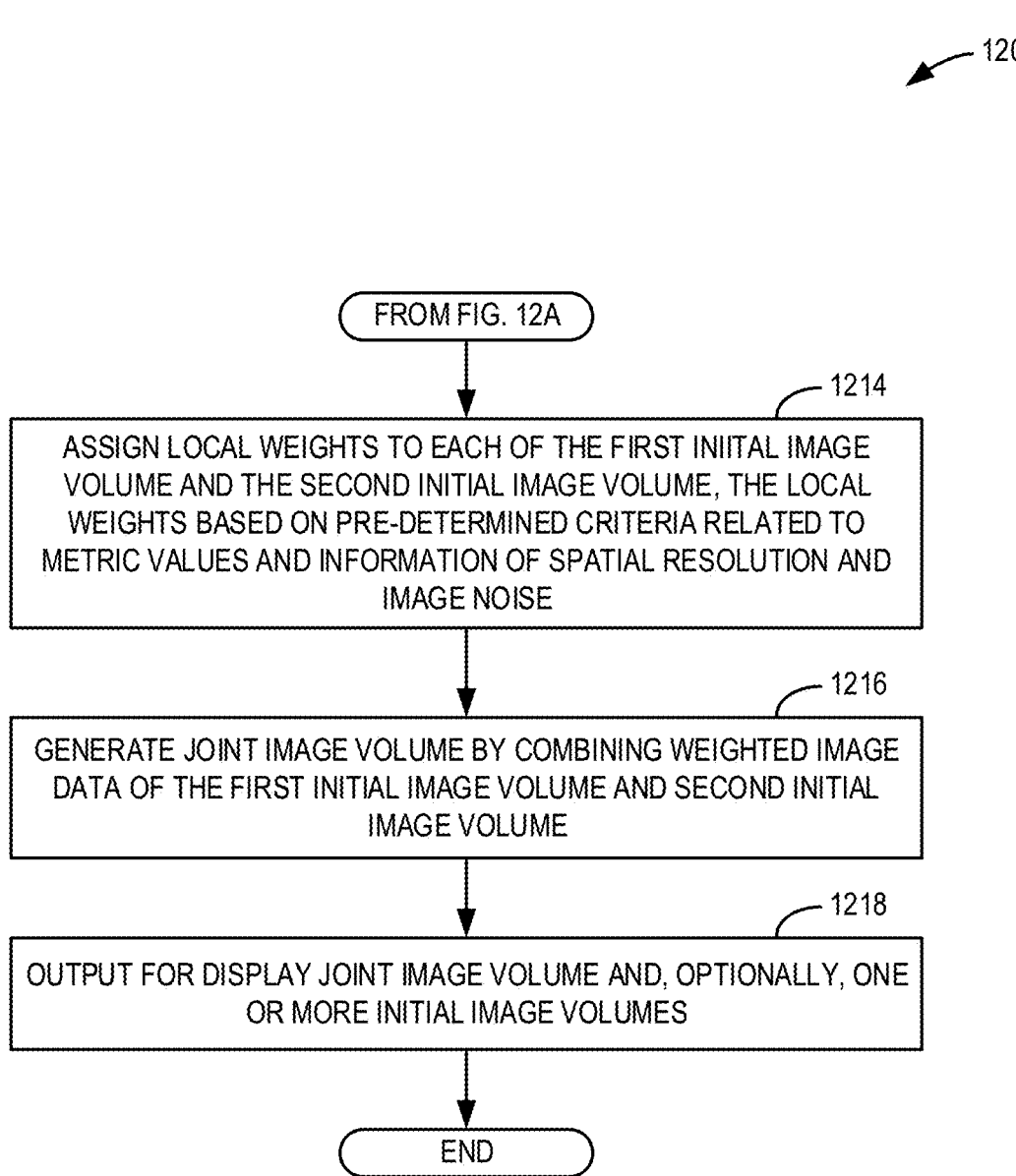

FIGS. 12A and 12B show a flow chart of a method 1200, which may be a variation of the method 1100 of FIGS. 11A and 11B. The method 1200 includes some of the same operations as the method 1100, and an additional operation of applying an image feature detection operator (e.g., the HSFD operator) to both high accuracy image data (e.g., the first initial image) and low accuracy image data (e.g., the second initial image). Applying the image feature detection operator to the high accuracy image data and the low accuracy image data may provide a more comprehensive optimization when generating an optimized image via selective recombination of classified image volume regions from different initial image volumes. The method 1200 is described in part with reference to FIGS. 11A and 11B. Like the method 1100, the method 1200 may be used to generate images in FIGS. 5-10, specifically the third image 506 and the sixth image 512 of FIG. 5, and images of the third group of images 606, 806, 906, and 1006 of FIGS. 6-10. The method 1200 is described with regard to the systems and components of FIGS. 1-3, though it should be appreciated that the method 1200 may be implemented with other systems and components without departing from the scope of the present disclosure. Method 1200 may be implemented as executable instructions in memory, such as non-transitory memory of the memory module 82, and executed by one or more processors such as the data acquisition processor 48 and the image reconstruction processor 50, as an illustrative and non-limiting example.

As described with respect to operations 1102-1108 of the method 1100, the method 1200 may include acquiring imaging scan data with different accuracy properties at 1202, sorting imaging scan data into two groups based on an anticipated accuracy metric at 1204, reconstructing a first initial image volume from a data group having a highest accuracy at 1206, and reconstructing a second initial image volume from a data group including low accuracy data at 1208. The method 1200 is described herein as sorting imaging scan data into two data groups, however in some embodiments, the method 1200 may include sorting imaging scan data into more than two groups, without departing from the scope of the present disclosure. For example, the acquired data may be sorted into a first group that includes high accuracy image data, a second group that includes medium accuracy image data, and a third data group that includes low accuracy image data. In further embodiments, the acquired data may be sorted into more than three image data groups, based on the anticipated accuracy metric.

At 1210, the method 1200 includes calculating information about typical spatial resolution and image noise for each of the first initial image volume and the second initial image volume. Spatial resolution and image noise information may be determined for the initial image volumes using conventional image analysis methods.

At 1212, the method 1200 includes applying to each of the first initial image volume and the second initial image volume an operator which provides a metric, as volumetric data, related to local high spatial frequencies and image contrast. For example, the operator may include two or more separate functions to calculate local image feature contrast, local spatial frequencies, and local image noise. Weights are then calculated based on ratios between metrics of the high accuracy images and the low accuracy images, as described below. Lesion-like features may be identified using various known imaging processing techniques, such as blob-detection. Local spatial resolution may be calculated using various known wavelet techniques. Local image noise may be calculated by applying a statistical operator, such as standard deviation on selective medium spatial frequencies which may be extracted using a wavelet analysis.

At 1214, the method 1200 includes assigning local weights for joining the first initial image volume and the second initial image volume. Local weights may be assigned based on pre-determined criteria which are related to respective metric values and the information about spatial resolution and image noise for each of the initial image volumes. For example, a small lesion-like image structure and its background vicinity may be automatically detected in operation 1212. The operator may determine background contrast using equation 2:

$$\text{contrast} = (Va - Vb)/(Va + Vb) \qquad (2)$$

where Va is an image value of the lesion-like image structure, and Vb is a value of the near background. In further embodiments, local noise S may be estimated, and a contrast-to-noise ratio may be calculated using equation 3:

$$\text{contrast-to-noise ratio} = (Va - Vb)/S \qquad (3).$$

Weights may increase where the metric of the first initial image (e.g., M1), a ratio of the metric of the first image to the metric of the second image (e.g., M1/M2), a ratio of the typical spatial resolution of the first image to the typical spatial resolution of the second image (e.g., R1/R2), and a ratio of the image noise of the second image to the image noise of the first image (e.g., N2/N1) are increasing. From an algorithmic perspective, applying weights (W) to the first initial image volume may be noted as X W, and applying weights to the second initial image volume may be notes as X (1-W).

In some embodiments, weighting parameters between a combination of high accuracy data and low accuracy data may be dependent on a specific clinical application of the method, or imaging subject (e.g., patient) characteristics. For example, in cardiac and/or brain imaging protocols, the organ of interest may be positioned in a center of the large axial FOV PET system. In this case, a portion of oblique LORs will be relatively high. These considerations may also be relevant when the imaging subject is an infant. In other applications, such as a whole body scan of a patient, specific organs or anatomical regions may be spatially close to an edge of the imaging device, and therefore a respective portion of oblique LORs may be relatively small.

At 1216, the method 1200 includes generating a joint image volume by combining weighted image data of the first initial image volume and the second initial image volume. For example, weighted data of the first initial image volume (e.g., X W) and weighted data of the second initial image volume (e.g., X (1-W)) may be combined to generate a joint image volume.

At 1218, the method 1200 includes outputting for display the join image volume and, optionally one or more of the first initial image volume and the second initial image volume. For example, the optimized image and one or more of the initial image volumes may be output for display on the display device 96 of FIG. 2. In this way, the method 1200 provides an alternative method for selective recombination of reconstructed image data, where the first initial image volume and the second initial image volume are jointly used to generate the joint image. This method may be especially useful in generation of images where small detail visualization is desired, such as images of lesions in a lung.

Figure 13:
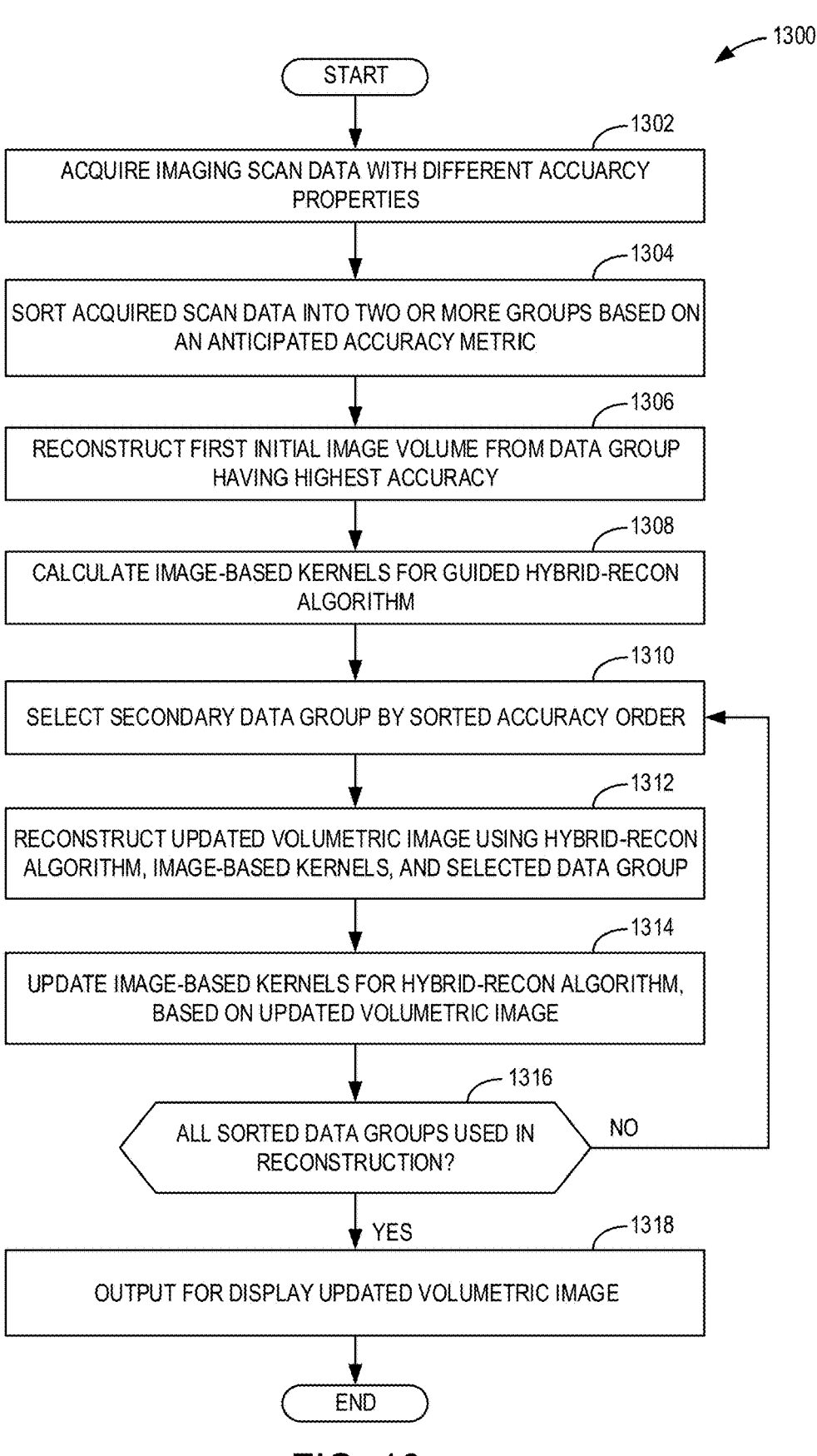
FIG. 13 illustrates a flow chart of a method for selective recombination of image regions using iterative recombination, according to embodiments of the disclosure.

FIG. 13 shows a flow chart of a method 1300, which may be a variation of the method 1100 and the method 1200 for selective recombination of reconstructed image regions. The method 1300 describes performing selective recombination during image reconstruction, as opposed to performing selective recombination post-reconstruction, as described with respect to FIGS. 11A-12B. The method 1300 includes some of the same operations as the method 1100 and the method 1200. Performing selective recombination during image reconstruction may decrease a total number of images generated, as a generated image is updated rather than combined with an additionally generated image. This may decrease memory usage and processing power of a computing device, which may increase a speed of image generation. The method 1300 is described in part with reference to FIGS. 11A-12B. Like the method 1100 and the method 1200, the method 1300 may be used to generate images in FIGS. 5-10, specifically the third image 506 and the sixth image 512 of FIG. 5, and images of the third group of images 606, 806, 906, and 1006 of FIGS. 6-10. The method 1300 is described with regard to the systems and components of FIGS. 1-3, though it should be appreciated that the method 1300 may be implemented with other systems and components without departing from the scope of the present disclosure. Method 1300 may be implemented as executable instructions in memory, such as non-transitory memory of the memory module 82, and executed by one or more processors such as the data acquisition processor 48 and the image reconstruction processor 50, as an illustrative and non-limiting example.

As described with respect to operations 1102-1106 of the method 1100, and operations 1202-1206 of the method 1200, the method 1300 may include acquiring imaging scan data with different accuracy properties at 1302, sorting imaging scan data into two or more groups based on an anticipated accuracy metric at 1304, and reconstructing a first initial image volume from a first group having a highest accuracy at 1306.

At 1308, the method 1300 includes calculating image-based kernels for a guided hybrid-reconstruction algorithm. For example, the guided hybrid-reconstruction algorithm may be hybrid kernelized expectation maximization (HKEM).

At 1310, the method 1300 includes selecting a secondary data group by sorted accuracy order. For example, when the imaging scan data is sorted into more than two groups, the secondary data group may be the group having the next most accurate data, following the first group having the highest accuracy data.

At 1312, the method 1300 includes reconstructing an updated volumetric image using the guided hybrid-reconstruction algorithm, image-based kernels, and the selected data group. At 1314, the method 1300 includes updating the image-based kernels for use with the hybrid-reconstruction algorithm based on the updated volumetric image.

At 1316, the method 1300 includes determining if all sorted data groups have been used in reconstruction of the updated volumetric image. As described above, the first initial image volume is reconstructed from a first group having the highest accuracy of the two or more groups, and the secondary data group is used in reconstruction of the updated volumetric image. In some embodiments, the imaging scan data is sorted into more than two groups. As described with respect to FIGS. 11A and 11B, imaging scan data may be sorted into a high accuracy group, a medium accuracy group, and a low accuracy group, depending on an axial angle at which the LORs intersect. With respect to FIG. 13, the high accuracy group may be used to reconstruct the first initial image volume and the medium accuracy group may be selected as the secondary data group used to reconstruct the updated volumetric image. The method 1300 enables continuous, iterative reconstruction of the updated volumetric image to incorporate in the updated volumetric image data which provides desirable accuracy and contrast-to-noise ratio in different regions thereof. If it is determined at 1316 that all sorted data groups have not been used in reconstruction, the method 1300 returns to 1310 to select a secondary data group by sorted accuracy order. Using the example of FIGS. 11A and 11B, the low accuracy group may be the secondary group which is selected at a second execution of operation 13010, following use of the medium data group as the secondary data group during the first execution of operation 1310. The method 1300 proceeds to continuously update reconstruction of the updated high accuracy image from each subsequent accuracy group (e.g., sorted data group) and updated kernel calculation. In embodiments where the imaging scan data is sorted into more than three groups, the method 1300 again returns to operation 1310 to select a secondary data group by sorted accuracy order, and use the selected secondary group in reconstruction of the updated volumetric image. This cycle may be repeated as many times as it takes to use all of the sorted data groups in reconstruction of the updated volumetric image. If it is determined at 1316 that all available data groups have been used in reconstruction, the method 1300 proceeds to 1318 to output for display an updated volumetric image.

FIG. 14 shows a graph 1400 of a synthetic simulation signal demonstrating a principle of improving overall contrast-to-noise ratio of a measured signal by automatically optimizing selective utilization of high-resolution and low-resolution data sampling. For clarity and simplicity, data 1402 of the graph 1400 may be of a one-dimensional signal. However, the same principal may be used for two-dimensional and three-dimensional data in different variations of medical imaging modalities. The data 1402 includes a one-dimensional vector with a baseline value, and two pairs of close rectangular structures. A trend line 1404 is included in the graph 1400 for visualization of the data 1402. The trend line 1404 shows a first pair 1406 of close rectangular structures, and a second pair 1408 of close rectangular structures. The first pair 1406 shows data 1402 having small peaks with high intensities, and second pair 1408 shows data 1402 having large peaks with low intensities. During the synthetic simulation used to generate data 1402 of the graph 1400, white noise is added to the one-dimensional signal to generate a 'noisy' signal, and the noisy signal is sampled by applying a Gaussian filter with a pre-determined sigma value (e.g., scalar or vector value used to calculate Gaussian kernel). In some embodiments, two Gaussian filters may be applied, or a Gaussian filter and a second, non-Gaussian filter may be applied. For example, Gaussian or Poisson noise may be used in the simulation without limitations. Of the two applied filters, a first filter is applied for high-resolution and uses a narrow sigma value, and a second filter is applied for low-resolution and uses a wide sigma value. It is assumed that the high-resolution samplers and the low-resolution samplers are applied on different input data sets. For example, high-resolution samplers may be applied to a group of high-resolution data, such as the first group, and low-resolution samplers may be applied to a group of low-resolution data, such as the second group, described with respect to FIGS. 11A-13. In another embodiment, the different input data sets may be imaging scan data from an imaging system in which a first part of the photons are detected with high-resolution and a second part of the photons are detected with low-resolution. Thus, a different random noise (e.g., uncorrelated scan data) is added to the one-dimensional signal before sampling using each of the high-resolution sampler and/or the low-resolution sampler. The low-resolution filter may reduce an average noise more effectively, compared to the high-resolution filter. However, the low-resolution filter may also suppress a contrast (e.g., visibility) of fine structures, such as small lesions.

FIG. 15 shows a graph 1500 of samples of the synthetic simulation signal of FIG. 14 having different filters applied thereto, including a comparison of the contrast-to-noise ratio for each filtered sample. A first plot 1504 shows the original, one-dimensional signal, before noise is added. A second plot 1506 shows high-resolution sampling of the first plot 1504 (e.g., using a high-resolution filter), a third plot 1508 shows low-resolution sampling of the first plot 1504 (e.g., using a low-resolution filter), and a fourth plot 1510 shows a mean of high-resolution and low-resolution sampling of the first plot 1504 (e.g., a mean of the second plot 1506 and the third plot 1508). A fifth plot 1502 shows high frequencies detection on the high-resolution sampling. A sixth plot 1512 is an automatically constructed plot of selectively optimized sampling (e.g., selectively reconstructed image data). Selective optimized sampling is to be understood as performance of at least one of the methods described with respect to FIGS. 11A-13.

In some embodiments, calculation of selective optimized sampling may be performed as follows. The following description may be a variation on the methods described with respect to FIGS. 11A-13. A high frequency detection operator may be applied on a high-resolution sampling vector of imaging scan data. For example, the operator may be a Gaussian filter which is applied to an absolute value of convolution data with Laplacian-of-Gaussian kernels having two pre-determined width parameters. With respect to FIG. 15, the resulting vector of this operation is the fifth plot 1502. Based on a pre-calibration threshold (e.g., dashed line T in the graph 1500), regions to be sampled using high frequency sampling (e.g., above the dashed line T) and regions to be sampled using low frequency sampling (e.g., below the dashed line T) are determined. While the value of the dashed line T is the same for both the first pair 1406 and the second pair 1408, data of the fifth plot 1502 falls on different sides of the dashed line T for each of the first pair 1406 and the second pair 1408. Boundaries between a region of the first pair 1406 with high-resolution sampling (e.g., the second plot 1506 and the fourth plot 1510) are smoothly weighted, as is shown in an enlarged section 1550, along the dashed line T between the H and M regions.

In the example of FIG. 15, a contrast to noise ratio for each of the two structural pairs of rectangles (e.g., the first pair 1406 and the second pair 1408) is calculated statistically on 105 realizations of random noise. The summarized results are provided in a box 1520 of the graph 1500. For the first pair 1406 and the second pair 1408, automatic optimized sampling (e.g., the sixth plot 1512) has desirable results, compared to both high-resolution sampling (e.g., the fifth plot 1502) and mean sampling (e.g., the fourth plot 1510). Automatic optimized sampling provides a high contrast and low noise, while high-resolution sampling provides high contrast and high noise, and the mean sampling has low contrast and low noise due to averaging of uncorrelated noise. A contrast to noise ratio of the first pair 1406 (CA) filtered using selective optimized sampling is slightly less than the CA value from high-resolution sampling, and is significantly increased from the CA value from filtering using the mean of high and low-resolution sampling (e.g., 3.935 compared to 3.938 and 2.569, respectively). A contrast to noise ratio of the second pair 1408 (CB) filtered using selective optimized sampling is significantly greater than the CB value from high-resolution sampling, and is slightly less than the CB value from filtering using the mean of high and low-resolution sampling (e.g., 6.760 compared to 4.202 and 6.785, respectively). This shows that the method described herein for selective recombination of reconstructed image regions may desirably generate images which have different contrast to noise ratios for different regions of interest within an imaging subject.

A technical effect of the disclosure includes an increased imaging data statistics and reduced noise in reconstructed images. This may result in increased image contrast to noise ratio (CNR) and/or reduce a radiation dose and/or scan time of an imaging scan, which may preserve the CNR. Additionally, systems and methods described herein may allow performance of more accurate image reconstruction, thus increasing accuracy of image quantification.

The disclosure also provides support for a method, comprising: acquiring imaging scan data which includes data elements having different accuracy properties, sorting the imaging scan data into two or more different groups using an anticipated accuracy metric, reconstructing a first initial image volume from a first group of the two or more different groups, wherein the first group has a highest anticipated accuracy metric of the two or more different groups, reconstructing a second initial image volume from a combined data group, the combined data group comprising data of the first group and a second group of the two or more different groups, wherein the second group has a lower anticipated accuracy metric, compared to the first group, applying a high spatial frequencies detection (HSFD) operator on the first initial image volume, identifying criteria that relate an output of the HSFD operator to a pre-determined image resolution-to-noise tradeoff, classifying image volume regions of the first initial image volume, where the image volume regions correspond to the pre-determined image resolution-to-noise tradeoff, generating an optimized image volume by incorporating, for each of the image volume regions, corresponding image values from the first initial image volume and the second initial image volume, and outputting the optimized image volume for display on a display device. In a first example of the method, the imaging scan data includes data from multiple individual lines of response (LOR) having the different accuracy properties. In a second example of the method, optionally including the first example, the two or more different groups include individual groups for each different axial LOR angle or different ranges of axial LOR angles. In a third example of the method, optionally including one or both of the first and second examples, the imaging scan data includes data from multiple binned projections having the different accuracy properties. In a fourth example of the method, optionally including one or more or each of the first through third examples, anticipated accuracy is determined using geometry and physics of a system used to capture the imaging scan data, photon energy and statistics, and/or detection timing. In a fifth example of the method, optionally including one or more or each of the first through fourth examples, a reconstructed image generated from each group of the two or more different groups has different properties including spatial resolution, contrast, and noise. In a sixth example of the method, optionally including one or more or each of the first through fifth examples, the method further comprises: generating one or more additional reconstructed initial image volumes from the combined data of the first group and corresponding additional data groups of the two or more different groups, the corresponding additional data groups having further lower anticipated accuracy metric values, compared to the first group and the second group. In a seventh example of the method, optionally including one or more or each of the first through sixth examples, the pre-determined image resolution-to-noise tradeoff is received via a user input. In an eighth example of the method, optionally including one or more or each of the first through seventh examples, the method further comprises: applying smooth image value transitions on region boundaries of the optimized image volume. In a ninth example of the method, optionally including one or more or each of the first through eighth examples, the imaging scan data is acquired by a large axial field of view (FOV) positron emission tomography (PET) system.

The disclosure also provides support for an imaging system, comprising: a detector array including a plurality of detectors, a display device, and a computing device communicatively coupled to the detector array and the display device, and configured with instructions in non-transitory memory that when executed cause the computing device to: acquire imaging scan data including data elements with different accuracy properties, sort the imaging scan data into two or more different groups based on an anticipated accuracy metric, reconstruct a high accuracy image from a first group, the first group comprising data elements with a highest anticipated accuracy metric, calculate image-based kernels for a guided hybrid-recon algorithm, select a second group from the two or more different groups, the second group having a next highest accuracy data of a set of image data groups, with respect to the first group, reconstruct an updated high accuracy image from the high accuracy image, the image-based kernels, and the second group, update the image-based kernels for the guided hybrid-recon algorithm, based on the updated high accuracy image, and output the updated high accuracy image for display on the display device. In a first example of the system, the imaging system is configured to capture the imaging scan data having two or more distinct ranges of data accuracy, and the computing device is configured to continuously update reconstruction of the updated high accuracy image from each subsequent accuracy group and updated kernel calculation. In a second example of the system, optionally including the first example, the imaging system is a large axial field of view (FOV) positron emission tomography (PET) system. In a third example of the system, optionally including one or both of the first and second examples, the imaging system is a SPECT imaging system configured to perform cardiac scans and sort imaging data of a 180-degree acquisition into the first group comprising data elements with the highest anticipated accuracy metric and sort imaging data of a 360-degree acquisition into the second group having a next highest accuracy data of the set of image data groups, with respect to the first group. In a fourth example of the system, optionally including one or more or each of the first through third examples, the imaging scan data are sorted for different accuracy levels by separating detected coincidence photons by their energy, where photons within a narrow energy window around a peak will be considered as most accurate, and photons with energy in a lower energy window (further from the peak) will be considered as less accurate.

The disclosure also provides support for a method for selective recombination of reconstructed image data, comprising: acquiring imaging scan data having different accuracy metric values, sorting elements of the imaging scan data into two or more groups based on an anticipated accuracy metric of each element, reconstructing a first initial image volume from a first group of the two or more groups having a highest anticipated accuracy metric, reconstructing a second initial image volume from a second group of the two or more groups having a lower anticipated accuracy metric with respect to the first initial image volume, selectively recombining reconstructed image data from the first initial image volume and the second initial image volume to generate a joint image volume having regions of high-resolution and high image noise, as well as regions with low-resolution and low image noise, and outputting the joint image volume for display on a display device. In a first example of the method, selectively recombining the reconstructed image data comprises: calculating a spatial resolution and an image noise for each of the first initial image volume and the second initial image volume, applying an operator which provides a metric related to local high spatial frequencies and an image contrast to the first initial image volume and the second initial image volume, generating weighted image data by assigning local weights to each of the first initial image volume and the second initial image volume the local weights based on pre-determined criteria related to metric values and information of spatial resolution and image noise, and combining the weighted image data of the first initial image volume and the second initial image volume to generate the joint image volume. In a second example of the method, optionally including the first example, assigning the local weights includes adjusting parameter weights in response to specific clinical applications of an imaging subject. In a third example of the method, optionally including one or both of the first and second examples, selectively recombining the reconstructed image data comprises: applying a high spatial frequencies detection (HSFD) operator on the first initial image volume, identifying criteria which relate an output of the HSFD operator to a pre-determined image resolution-to-noise tradeoff, classifying image volume regions of the first initial image volume which correspond to the pre-determined image resolution-to-noise tradeoff, and generating the joint image volume by incorporating, for each classified image volume region, corresponding image values from the first initial image volume and the second initial image volume. In a fourth example of the method, optionally including one or more or each of the first through third examples, applying the HSFD operator includes implementing a Laplacian-of-Gaussian filter kernel to convolve three-dimensional image data with a determined filter kernel, smoothing resulting data, and comparing the smoothed resulting data to a pre-determined threshold, wherein values of the smoothed resulting data that are greater than the pre-determined threshold are related to regions indicating fine image structures and values of the smoothed resulting data equal to or less than the pre-determined threshold are related to low spatial frequencies to classify the image volume regions.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An imaging system, comprising:
a detector array including a plurality of detectors;
a display device; and
a computing device communicatively coupled to the detector array and the display device, and configured with instructions in non-transitory memory that when executed cause the computing device to:
acquire imaging scan data including data elements with different accuracy properties;
sort the imaging scan data into two or more different groups based on an anticipated accuracy metric;
reconstruct a high accuracy image from a first group, the first group comprising data elements with a highest anticipated accuracy metric;
calculate image-based kernels for a guided hybrid-reconstruction algorithm;
select a second group from the two or more different groups, the second group having a next highest accuracy data of a set of image data groups, with respect to the first group;
reconstruct an updated high accuracy image from the high accuracy image, the image-based kernels, and the second group;
update the image-based kernels for the guided hybrid-reconstruction algorithm, based on the updated high accuracy image; and
output the updated high accuracy image for display on the display device.

2. The imaging system of claim 1, wherein the imaging system is configured to capture the imaging scan data having two or more distinct ranges of data accuracy, and the computing device is configured to continuously update reconstruction of the updated high accuracy image from each subsequent accuracy group and updated kernel calculation.

3. The imaging system of claim 1, wherein the imaging system is a large axial field of view (FOV) positron emission tomography (PET) system.

4. The imaging system of claim 1, wherein the imaging system is a single photon emission computed tomography (SPECT) imaging system configured to perform cardiac scans and sort imaging data of a 180-degree acquisition into the first group comprising data elements with the highest anticipated accuracy metric and sort imaging data of a 360-degree acquisition into the second group having a next highest accuracy data of the set of image data groups, with respect to the first group.

5. The imaging system of claim 1, wherein the imaging scan data are sorted for different accuracy levels by separating detected coincidence photons by their energy, where photons within a narrow energy window around a peak will be considered as most accurate, and photons with energy in a lower energy window, further from the peak, will be considered as less accurate.

* * * * *